(12) United States Patent
Rice et al.

(10) Patent No.: US 12,730,029 B2
(45) Date of Patent: Sep. 8, 2026

(54) REUSABLE MODIFIED HELIUM SHROUD SOIL VAPOR SAMPLING SYSTEM WITH AN IN-LINE HELIUM DETECTOR

(71) Applicant: Enthalpy Analytical, LLC, North Little Rock, AR (US)

(72) Inventors: Will Rice, Oakland, CA (US); Jacob Hohn, Concord, CA (US)

(73) Assignee: Enthalpy Analytical, LLC, North Little Rock, AR (US)

( * ) Notice: Subject to any disclaimer, the term of this patent is extended or adjusted under 35 U.S.C. 154(b) by 316 days.

(21) Appl. No.: 18/677,135

(22) Filed: May 29, 2024

(65) Prior Publication Data

US 2025/0085183 A1 Mar. 13, 2025

Related U.S. Application Data

(60) Provisional application No. 63/581,804, filed on Sep. 11, 2023.

(51) Int. Cl.
*G01M 3/20* (2006.01)

(52) U.S. Cl.
CPC .............. *G01M 3/20* (2013.01); *G01M 3/202* (2013.01); *G01M 3/205* (2013.01)

(58) Field of Classification Search
CPC ......... G01M 3/20; G01M 3/202; G01M 3/205
See application file for complete search history.

(56) References Cited

U.S. PATENT DOCUMENTS

| | | | | |
|---|---|---|---|---|
| 4,576,038 A * | 3/1986 | Dixon | ..................... | G01M 3/04 73/40.7 |
| 5,010,776 A | 4/1991 | Lucero et al. | | |
| 5,029,463 A | 7/1991 | Schvester et al. | | |
| 5,522,271 A | 6/1996 | Turriff et al. | | |
| 6,035,701 A | 3/2000 | Lowry et al. | | |
| 6,391,262 B1 | 5/2002 | Brinton et al. | | |
| 2011/0042067 A1 | 2/2011 | Weikel et al. | | |
| 2021/0025778 A1 | 1/2021 | Ikegami | | |

FOREIGN PATENT DOCUMENTS

| | | | |
|---|---|---|---|
| EP | 0219250 A2 * | 4/1987 | .............. G01M 3/04 |
| JP | 10-19715 A * | 1/1998 | |

* cited by examiner

*Primary Examiner* — Paul M. West
(74) *Attorney, Agent, or Firm* — Iandiorio Teska & Coleman, LLP

(57) ABSTRACT

A reusable modified helium shroud soil vapor sampling system with an in-line helium detector includes a reusable, portable, sampling platform including a chimney attachable to a well head. The sampling platform includes an area for placement of at least one disposable three-way valve, at least one flow controller, at least one sampling can, an ambient helium detector, a line coupled to a helium tracer source, at least one vapor sampling line coupled to a soil vapor sampling well at a predetermined depth, and at least one purge line coupled to at least one purge source. An in-line helium detector is coupled between the at least one purge line and the at least one purge source, and a flexible collapsible shroud cover is configured to optimally seal a volume of helium between the shroud cover and the sampling platform.

29 Claims, 25 Drawing Sheets

96
90
106
86
88
96
90
90
92
82
96
106
84
90
96

80
82
88
98
106
98
106
86
106
98
84
98

70
10
20
20
22
22
36
40
12
C-Squared Analyzer
Helium %
Pwr
Low Bat
Chg

REUSABLE MODIFIED HELIUM SHROUD SOIL VAPOR SAMPLING SYSTEM WITH AN IN-LINE HELIUM DETECTOR

RELATED APPLICATIONS

This application claims benefit of and priority to U.S. Provisional Application Ser. No. 63/581,804 filed Sep. 11, 2023, under 35 U.S.C. §§ 119, 120, 363, 365, and 37 C.F.R. § 1.55 and § 1.78, which is incorporated by reference herein.

FIELD OF THE INVENTION

This invention relates to a reusable modified helium shroud soil vapor sampling system with an in-line helium detector.

BACKGROUND OF THE INVENTION

A conventional helium shroud soil vapor sampling system may be used to collect a soil vapor sample of contaminant vapors from below the ground, e.g., volatile organic compounds (VOCs), methane, petrol compounds, and the like. A conventional helium shroud soil vapor sampling system typically includes, inter alia, a rigid rectangular shaped shroud, a flow controller, an optional three-way valve, a sampling can, a source of helium, an ambient helium detector placed inside the shroud, a vacuum source, a purge line, and a soil vapor sampling line coupled to a well head.

In operation, the flow controller and the three-way valve are typically affixed to the wall of the shroud and the purge and vapor sampling lines are attached to the three-way valve. In order to ensure the flow controller, the three-way valve, the connections thereto, and the connection to the sampling can do not have leaks which would affect the integrity of the soil vapor sample, the rigid shroud is filled with trace helium to a predetermined level, e.g., to about 20% to about 40%, measured by the ambient helium detector inside the shroud. The well is purged, and then the soil vapor sample is taken using the three-way valve, the flow controller, the lines, and the sampling can. The sampling can is then sent to a laboratory for testing. If helium is detected in the vapor sample, it indicates there was leak in the system and the sample is compromised. There is no in-field leak check for leak integrity.

Thus, conventional helium shroud soil vapor sampling systems are not able to pre-empt breakthroughs to the sample path or the well integrity. Because the flow-controller and the three-way valve are affixed to the wall of the shroud and must be certified each time they are removed, conventional helium shroud soil vapor sampling systems are not reusable in the field. Additionally, each vapor sample requires a new system.

Moreover, the large rigid shape of the conventional shroud utilizes a large volume of helium as well as time/attention to maintain and sample within a larger shroud area, causing loss in field time and over consumption of helium, which are expensive and can lead to a failure in completing sampling plan within a given site access window.

Thus, there is a need for helium shroud soil vapor sampling system which is reusable, portable, provides for in-field leak check integrity, eliminates the need for a new system for each soil vapor sample, uses less helium, prevents cross contamination of samples, reduces operational time to purge and sample, provides a portable workstation for use in the field, and reduces the overall cost to take multiple soil vapor samples.

BRIEF SUMMARY OF THE INVENTION

In one aspect, a reusable modified helium shroud soil vapor sampling system with an in-line helium detector is featured. The system includes a reusable, portable, sampling platform including a chimney attachable to a well head. The sampling platform includes an area for placement of at least one disposable three-way valve, at least one flow controller, at least one sampling can, an ambient helium detector, a line coupled to a helium tracer source, at least one vapor sampling line coupled to a soil vapor sampling well at a predetermined depth, and at least one purge line coupled to at least one purge source. An in-line helium detector is coupled between the at least one purge line and the at least one purge source, and a flexible collapsible shroud cover is configured to optimally seal a volume of helium between the shroud cover and the sampling platform.

In one example, the collapsible shroud cover may be configured to minimize the volume of helium needed to determine leak integrity of at least one of: the at least one disposable three-way valve, a connection between the disposable three-way valve and the at least one purge line, a connection between the disposable three-way valve and the vapor sampling line, a connection between the disposable three-way valve and the flow controller, and/or a connection between the flow controller and the sampling can. The at least one disposable three-way valve may be configured to prevent cross-contamination of compounds in the soil vapor. The at least one disposable three-way valve may be configured to provide for reuse of the system. The line coupled to the helium source may introduce helium tracer to establish the volume of helium between the flexible collapsible shroud cover and the reusable platform. The ambient helium detector may be configured to ensure a predetermined concentration of the volume of helium. The flexible collapsible shroud cover may be configured to minimize the volume of helium needed to determine the leak integrity by reducing the space populated with helium while the system is operational. The in-line helium detector may be configured to detect a predetermined threshold percentage of the helium tracer flowing in the at least one purge line, thereby indicating a breach of the leak integrity above a surface of a well. The in-line helium detector may be configured to detect a predetermined threshold percentage of the helium tracer flowing in the at least one purge line after the well has been purged with at least one well volume, thereby indicating a breach between a surface of the well and a sub-surface of the well. The at least one vapor sampling line coupled to the soil vapor sampling well at a predetermined depth may include a plurality of vapor sampling lines each coupled to the soil vapor sampling well at a different predetermined depth. One disposable three-way valve may be positioned to purge the vapor sampling line and another of the three-way valve is positioned to simultaneously enable collecting a soil vapor sample. The system may include at least one of a perimeter frame, weighted perimeter frame, or weighted chain placed about a perimeter of the sampling platform and over the flexible collapsible shroud cover to create an optimal seal between the flexible collapsible shroud cover and the sampling platform. The sampling platform may include a lip about a perimeter of the platform. At least one of a perimeter frame, weighted perimeter frame, or weighted chain may be insertable into the lip and over the flexible collapsible shroud cover to create an optimal seal between the flexible collapsible shroud cover and the sampling platform. The system may include a plurality of clamps placed about a perimeter of the platform and over the flexible collapsible shroud cover to create an optimal seal between the flexible collapsible shroud cover and the sampling platform. The system may include a flexible perimeter frame. The sampling platform may include a plurality of abutment members disposed on one or more sides of the sampling platform configured to secure the flexible perimeter frame over the flexible collapsible shroud cover to the create an optimal seal between the flexible collapsible shroud cover and the sampling platform. The system may include a hinged perimeter frame. The sampling platform may include a plurality of abutment members disposed on one or more sides of the sampling platform configured to secure the hinged perimeter frame over the flexible collapsible shroud cover to the create an optimal seal between the flexible collapsible shroud cover and the sampling platform. The hinged perimeter frame may include a plurality of frame members hingedly attached to each other by a plurality of hinge members. The plurality hinge members may be positioned to create a small gap between each of the frame members such that the hinged perimeter frame is flexible and adjustable. Each frame member may include a soft flexible seal configured to improve an optimal seal between the flexible collapsible shroud cover and the sampling platform. A plurality of frame members may each include a securing member configured to be disposed in a space below one or the plurality of abutment members to secure the hinged perimeter frame to the sampling platform. The system may include at least one elastic member affixed to the plurality of frame members configured to provide an adjustable volume of helium between the flexible collapsible shroud cover and the sampling platform. The chimney may include a housing attachable to the well head configured to create a seal over the well head. The housing may include a window for receiving the at least one purge line and the helium line. The window may be sized to minimize loss of helium from the volume of helium and minimize ambient air infiltration into the volume of helium. The system may include an adapter plate including an opening therein configured to receive the chimney and provide for attachment of the chimney to a large well head. The system may include a flexible collapsible duplicate sampling splitter coupled to two sampling cans configured to minimize a size of the system.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
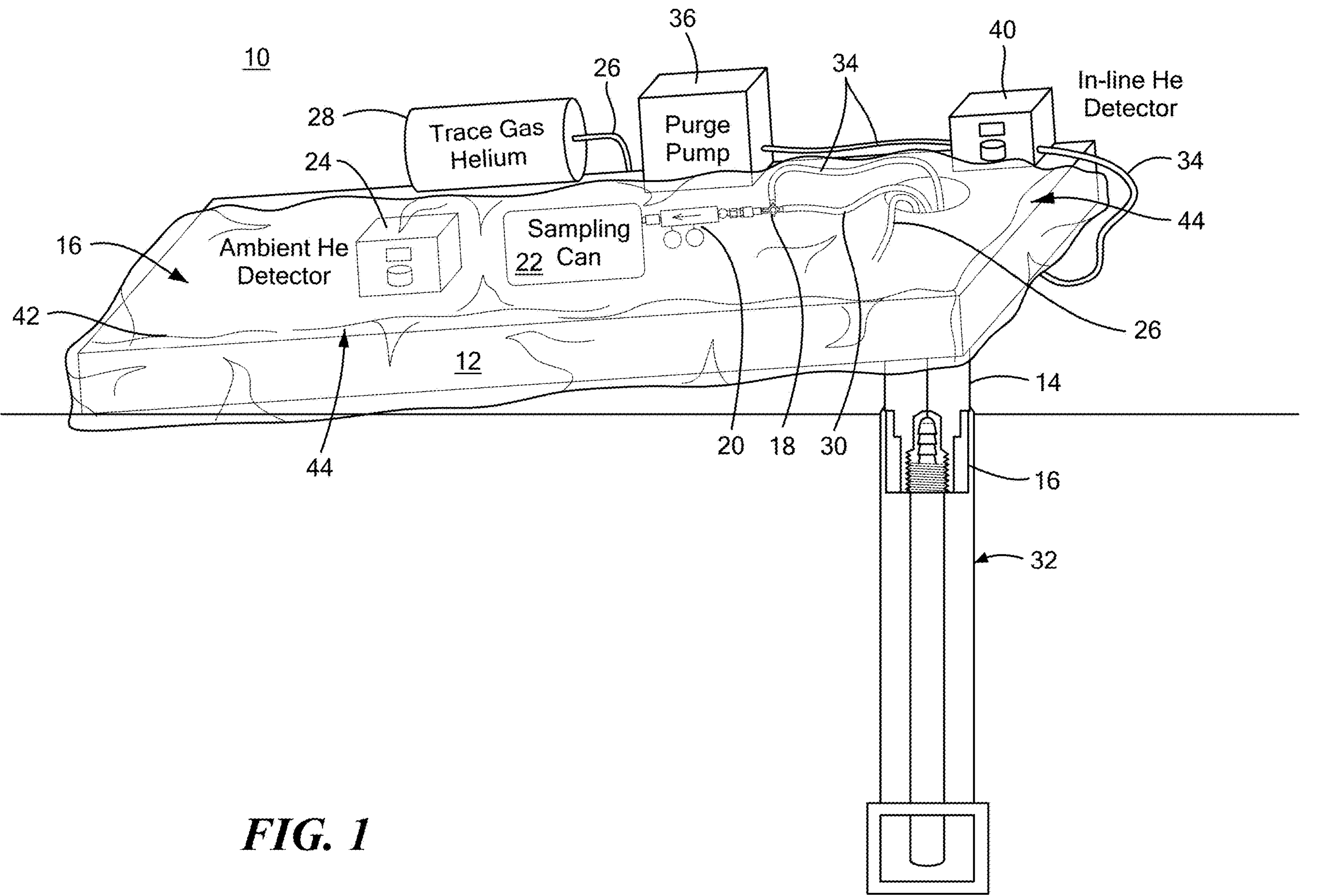
FIG. 1 is a schematic block diagram showing one example of the primary components of the reusable modified helium shroud soil vapor sampling system with an in-line helium detector.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in shown in FIG. 1, one example of reusable modified helium shroud soil vapor sampling system 10 with an in-line helium detector. System 10 includes reusable, portable, sampling platform 12 which includes chimney 14, shown in greater detail in FIG. 2, attachable to a well head, e.g., well head 16, FIG. 1. Sampling platform 12 includes an area, e.g., the area of the top surface of sampling platform 12, indicated generally by arrow 16, for a placement of at least one disposable three-way valve 18, shown in greater detail in FIG. 3, at least one flow controller 20, FIGS. 1 and 3, at least one sampling can 22, e.g., a Summa sampling can, ambient helium detector 24, line 26 coupled to helium tracer source 28, at least one vapor sampling line 30 coupled to soil vapor sampling well 32 at a predetermined depth, and at least one purge line 34 coupled to at least one purge source 36, e.g., a purge pump or similar type device.

System 10 also includes in-line helium detector 40 coupled between purge line 34 and purge pump 36 as shown.

Figure 4:
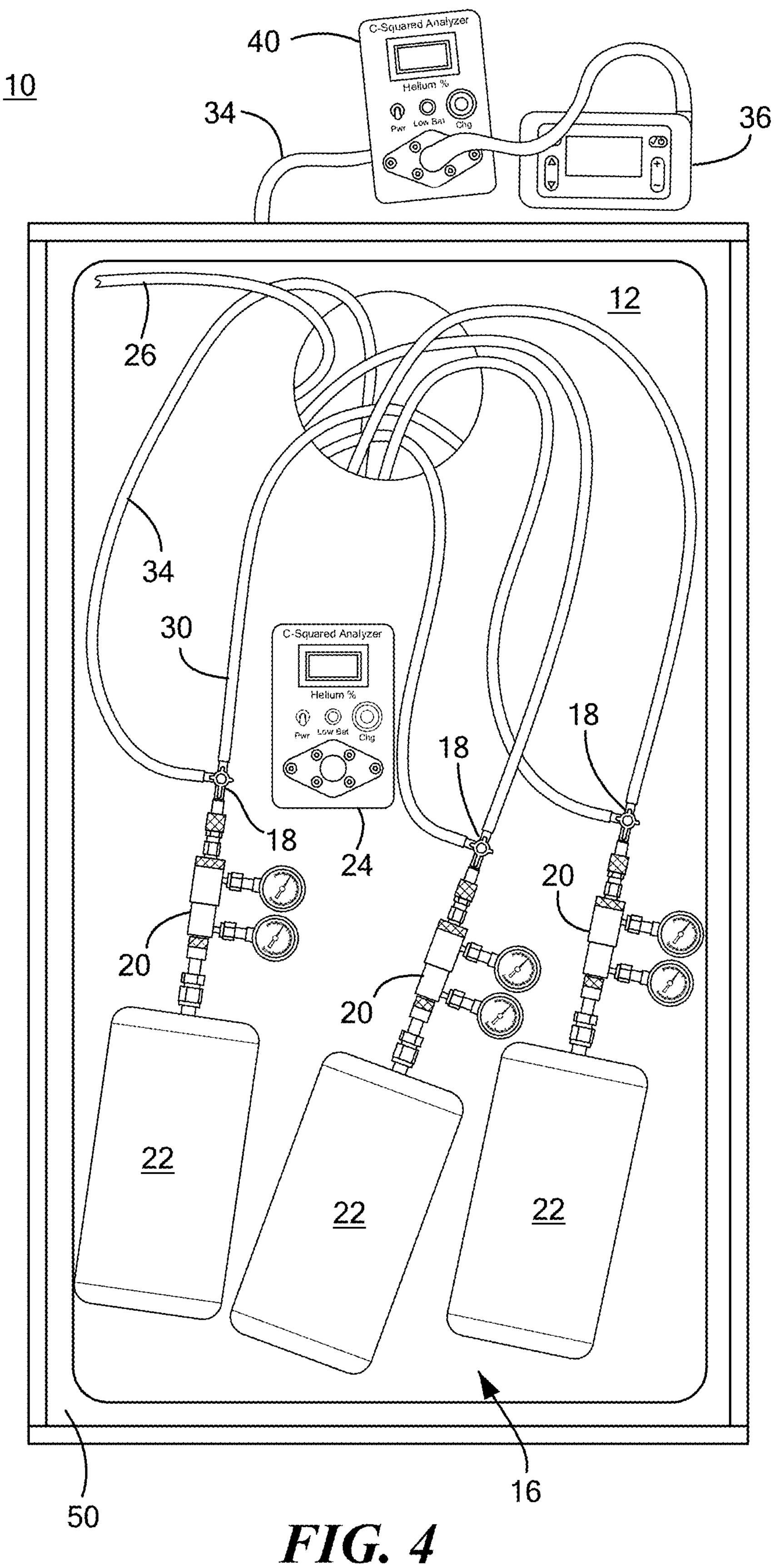
FIG. 4 is a top view showing in further detail one example of the components of the system shown in one or more of FIGS. 1-3 in place on the reusable, portable sampling platform.

FIG. 4 shows further detail an example of system 10 including reusable, portable, sampling platform 12 with area 16 for placement of at least one disposable three-way valve 18, at least one flow controller 20, at least one sampling can 22, ambient helium detector 24, line 26 coupled to helium tracer source 28, FIG. 1, at least one vapor sampling line 30, FIG. 4, at least one purge line 34 coupled to purge source 36, and in-line helium detector 40 coupled between purge line 34 and purge source 36. In this example, system 10 includes three disposable three-way valves 18, three flow controllers 20, three sampling cans 22, three vapor sampling lines 30, and three purge lines 34. In other examples, system 10 may include just one or more than three disposable three-way valves 18, flow controllers 20, sampling cans 22, vapor sampling lines 30, and purge lines 34.

Figure 5:
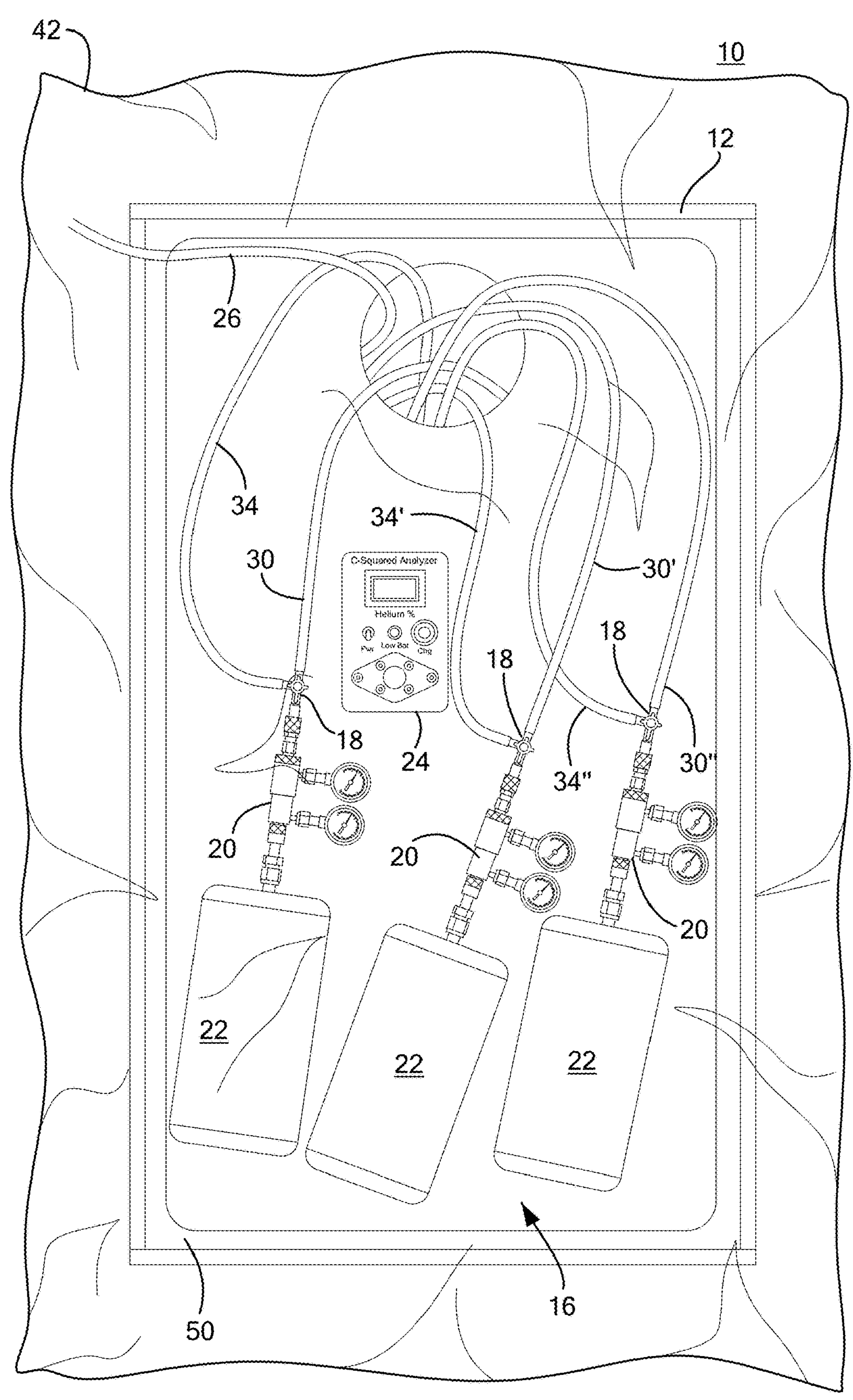
FIG. 5 is a top view showing the flexible collapsible shroud cover in place over the components shown in FIG. 4 to create an optimal seal between the flexible collapsible shroud cover and the sampling platform.

System 10, shown in one or more of FIGS. 1-4, also includes flexible collapsible shroud cover 42, FIG. 1, e.g., a sheet of plastic or similar flexible collapsible material, shown in greater detail in FIG. 5, which creates an optimal seal between the flexible collapsible shroud cover 42 and the sampling platform 12 to seal a volume of helium between shroud cover 42 and sampling platform 12, e.g., the volume of helium indicated generally by arrow 44, FIG. 1. As disclosed herein, an optimal seal provides a seal which is sufficient to seal the volume of helium between shroud cover 42 and sampling platform 12 to create an optimal seal between the flexible collapsible shroud cover 42 and the sampling platform, as discussed below.

Figure 6:
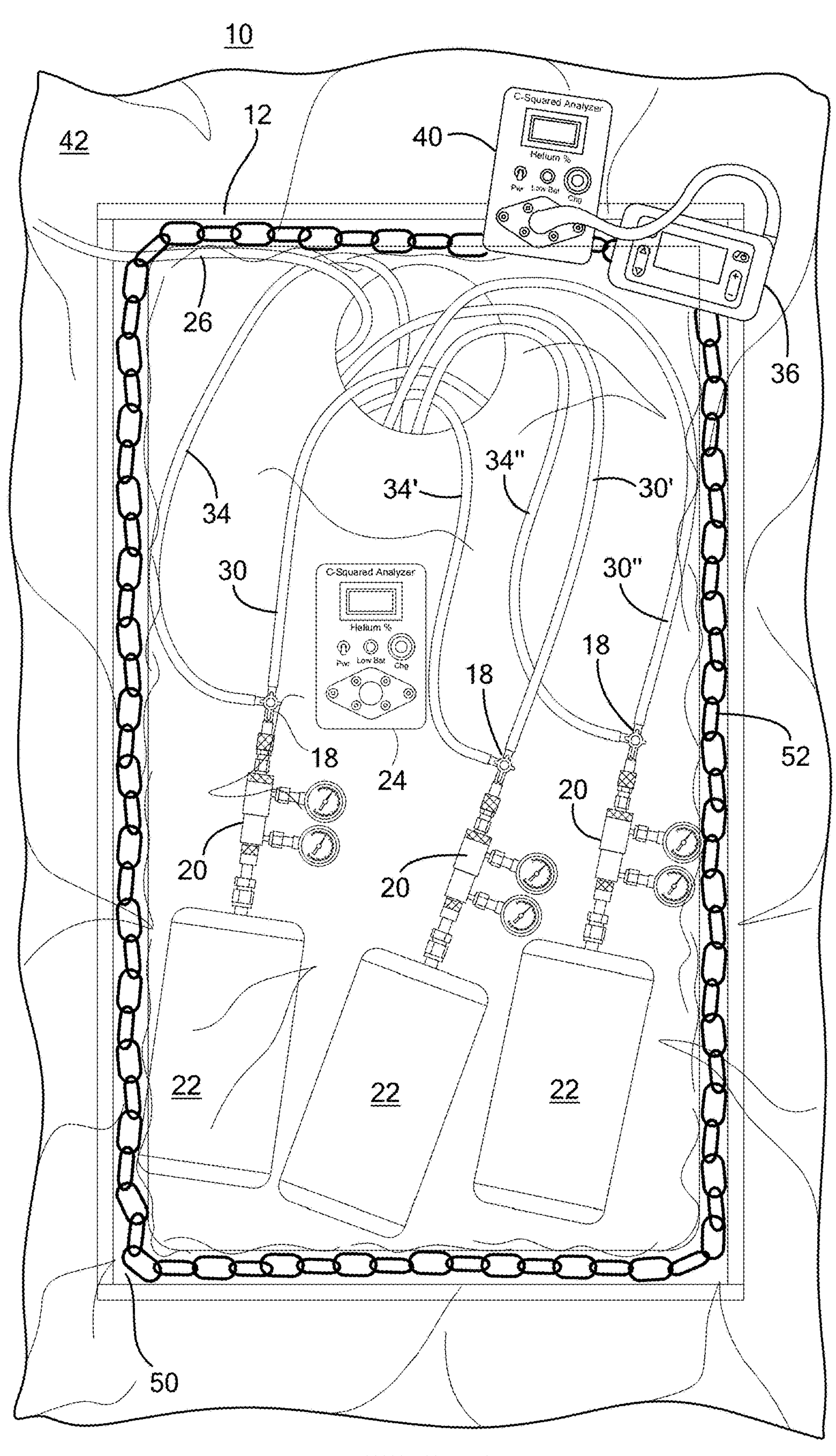
FIG. 6 is a top view showing an example of a weighed chain which may be used to secure the flexible collapsible shroud cover over the sampling platform to create an optimal seal between the flexible collapsible shroud cover and the sampling platform.

In one design, sampling platform 12 preferably includes lip 50, FIG. 5, about the perimeter of platform 12 as shown. In one example, weighted chain 52, FIG. 6 may be placed into lip 50 as shown to create the optimal seal between flexible collapsible shroud cover 42 and sampling platform 12 as shown.

Figure 7:
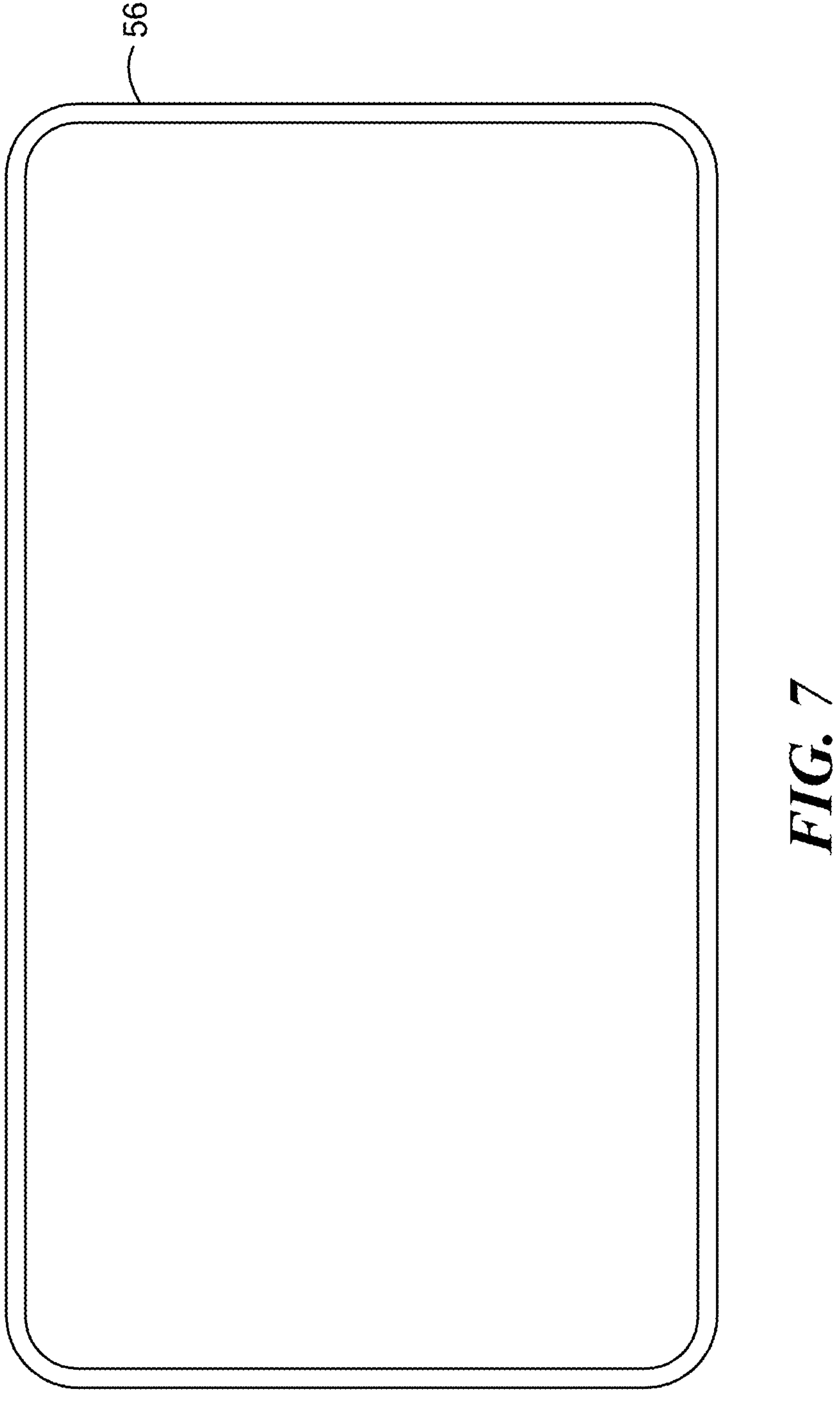
FIG. 7 is a top view showing an example of a perimeter frame which may be used to secure the flexible collapsible shroud cover over the sampling platform.

In another example, system 10 may include a perimeter frame, e.g., perimeter frame 56, FIG. 7, which is preferably insertable into lip 50, FIG. 5 and placed over flexible collapsible shroud cover 42 to create the optimal seal. In this example, perimeter frame is preferably made of a rigid material, such as plastic, wood, metal, metal alloy, or similar type rigid material. Perimeter frame 56 may be weighted to create the optimal seal. In one example, clamps may be placed about the perimeter of platform 12 to create the optimal seal.

Figure 8:
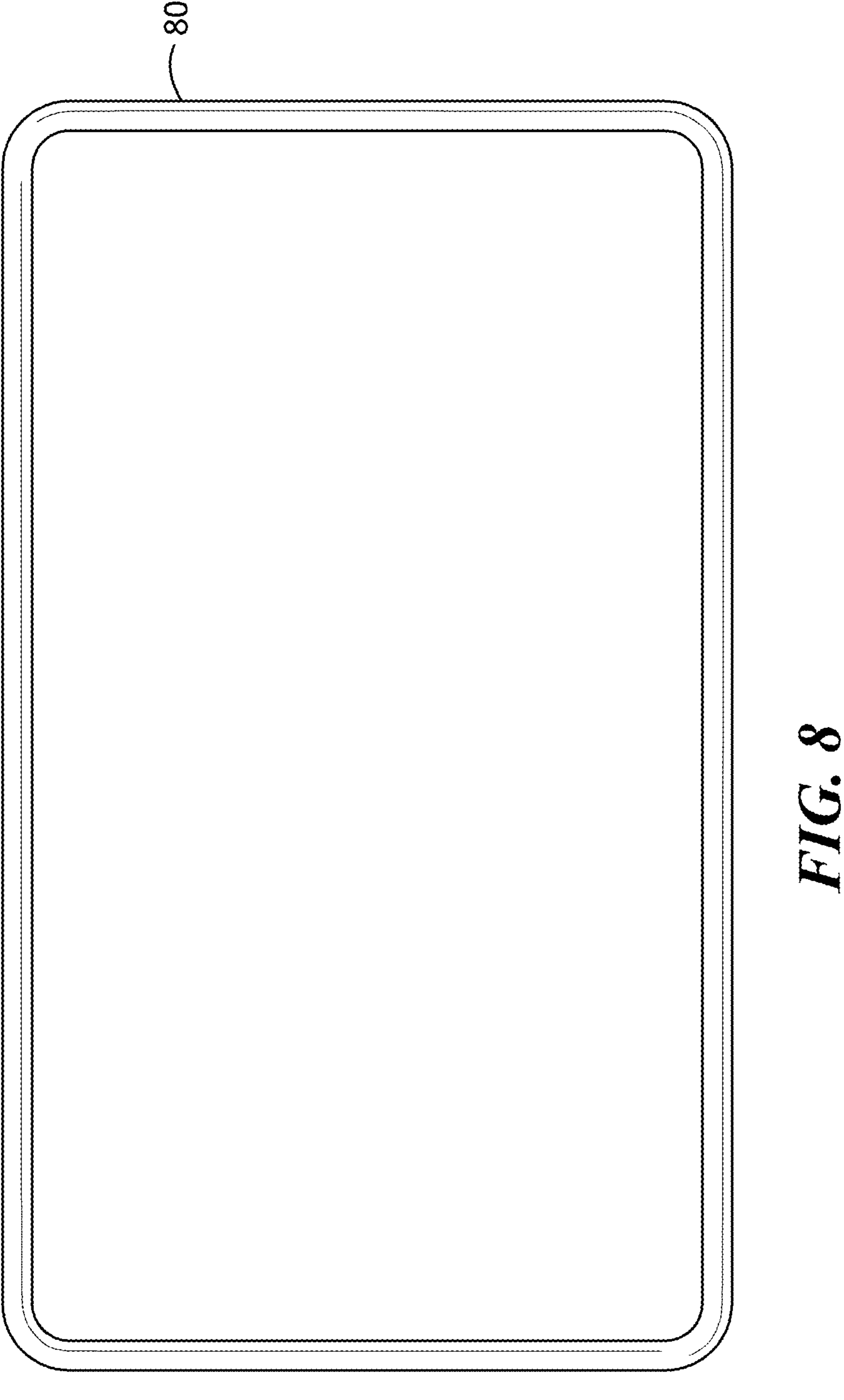
FIG. 8 is a top view showing an example of a flexible perimeter frame which may be used to secure the flexible collapsible shroud cover to the sampling platform.
Figure 9:
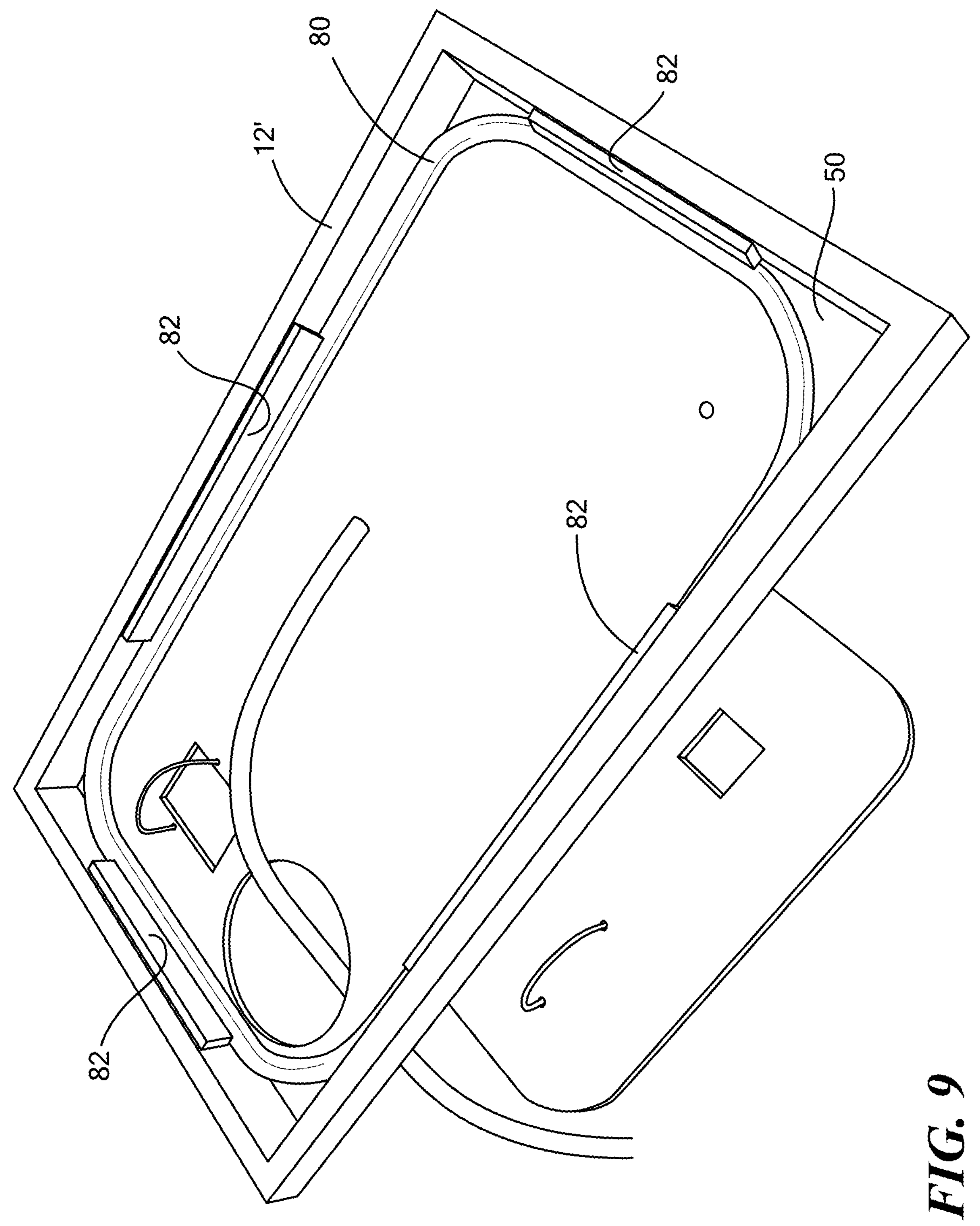
FIG. 9 is a top view showing an example of a flexible perimeter frame shown in FIG. 8 in place in the sampling platform.
Figure 10:
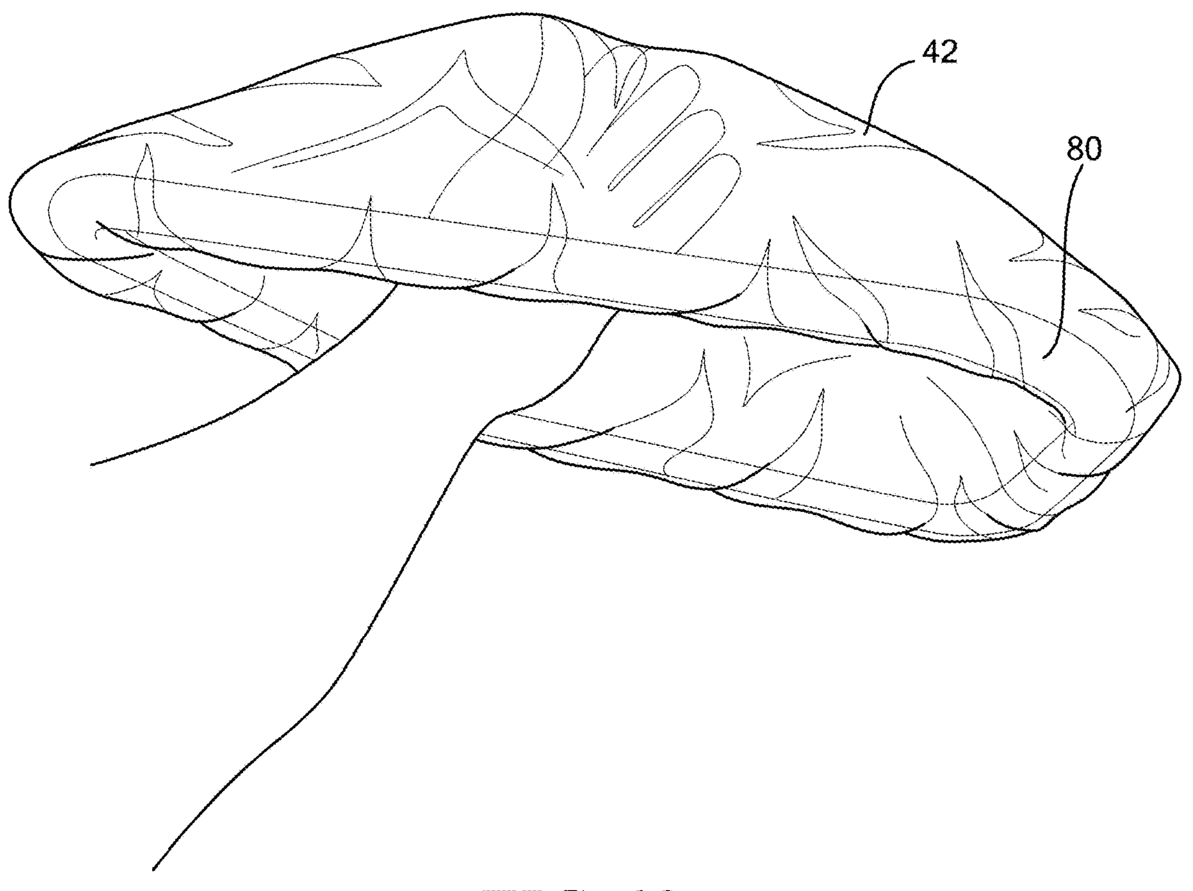
FIG. 10 is a three-dimensional side view showing an example of the flexible collapsible shroud cover attached to the flexible perimeter frame shown in FIGS. 8 and 9.
Figure 11:
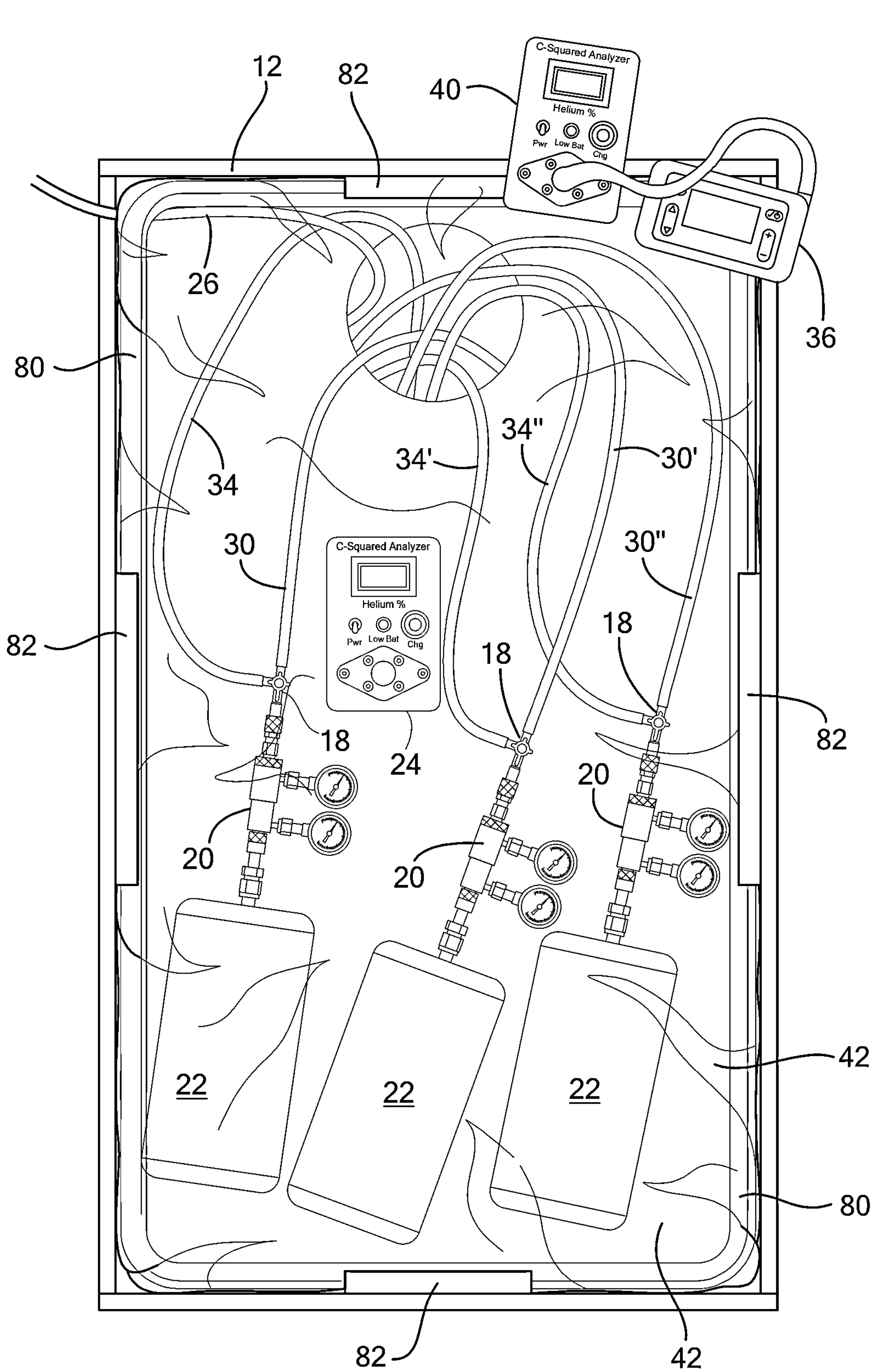
FIG. 11 is a top view showing an example of the flexible collapsible shroud cover secured in place to the sampling platform using the flexible perimeter frame shown in FIG. 8-10 to create an optimal seal between the flexible collapsible shroud cover and the sampling platform.

In another example, system 10 may include a flexible perimeter frame 80, FIG. 8. In this example, flexible perimeter frame 80 may be tubular as shown or may be square or rectangular shaped. Flexible perimeter frame 80 is preferably made of a flexible material, such as plastic, rubber, silicon, or similar type flexible material. Flexible perimeter frame 80 is preferably placed about the perimeter of sampling platform 12', e.g., as shown in FIG. 9. In this example, sampling platform 12' preferably includes a plurality of abutment members 82 which may be used to secure flexible perimeter frame 80 in place as shown. In one exemplarily operation, flexible collapsible shroud cover 42 is preferably secured to flexible perimeter frame 80, e.g., as shown in FIG. 10, and then secured in place in sampling platform 12' to create the optimal seal between flexible collapsible shroud cover 42 and sampling platform 12', e.g. as shown in FIG. 11.

Figure 12:
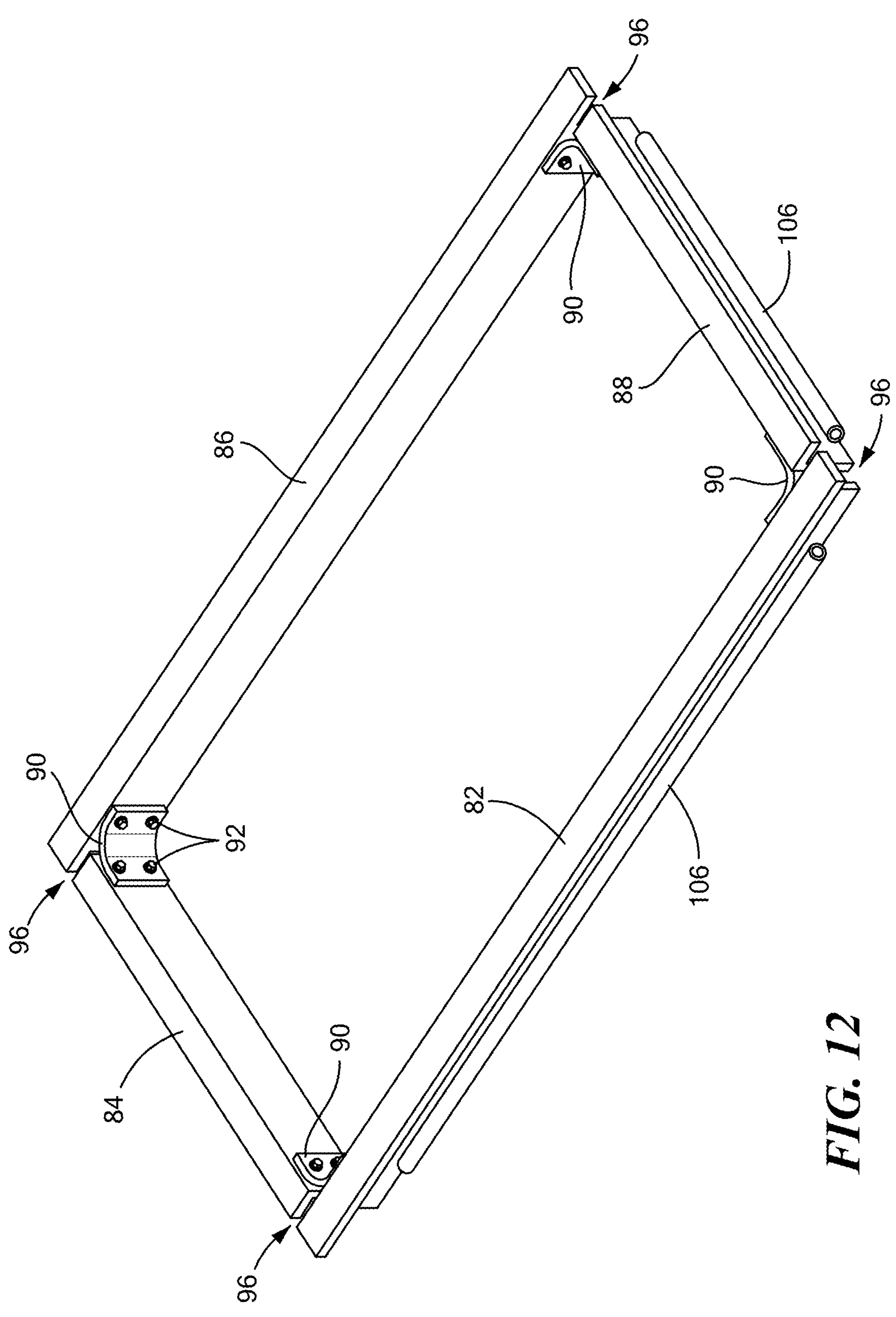
FIG. 12 is a three-dimensional view showing an example of a hinged perimeter frame which may be used to secure the flexible collapsible shroud cover to the sampling platform.
Figure 13:
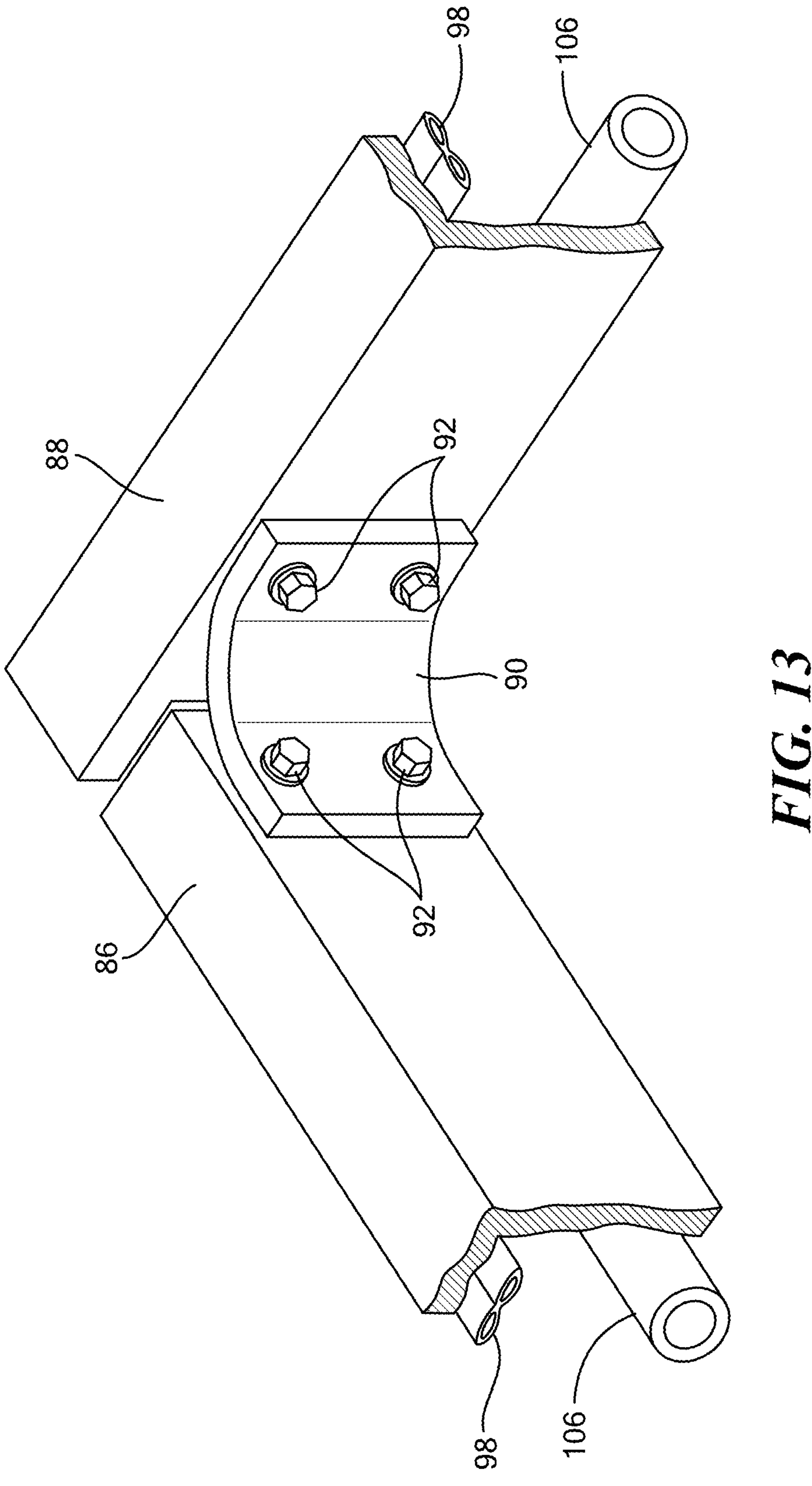
FIG. 13 is a three-dimensional view showing in further detail an example of a hinge member shown in FIG. 12 hingedly attached to frame member.

In yet another example, system 10 may include hinged perimeter frame 80, FIG. 12. Hinged perimeter frame 80 preferably includes frame members 82, 84, 86, and 88 sized such that hinged perimeter frame 80 is insertable into sampling platform 12'. Frame members 82, 84, 86, and 88 are preferably hingedly attached to each other using hinge members 90 as shown. Preferably there is a small gap, exemplarily indicated at 96, between each of frame members 82, 84, 86, and 88. The result is hinged perimeter frame 80 can flex and twist such that it can easily be inserted into sampling platform 12', as discussed below. In one example, each of hinge members 90 may be composed of a small piece of a flexible material, such as rubber, plastic, or similar type flexible material, as shown and secured to the joints between frame members 82, 84, 86, and 88 preferably using a plurality fastening devices, exemplarily indicated at 92. The plurality of fastening devices 92 may include screws, hex bolts, nails, or similar type fastening devise. In other designs, an adhesive, preferably completely free of chemicals that may release undesirable gases, may be utilized instead of fastening devices. FIG. 13 shows in further detail an example of a hinge member 90 hingedly attached to frame members 86 and 88 using a plurality of fastening devices 90.

Figure 14:
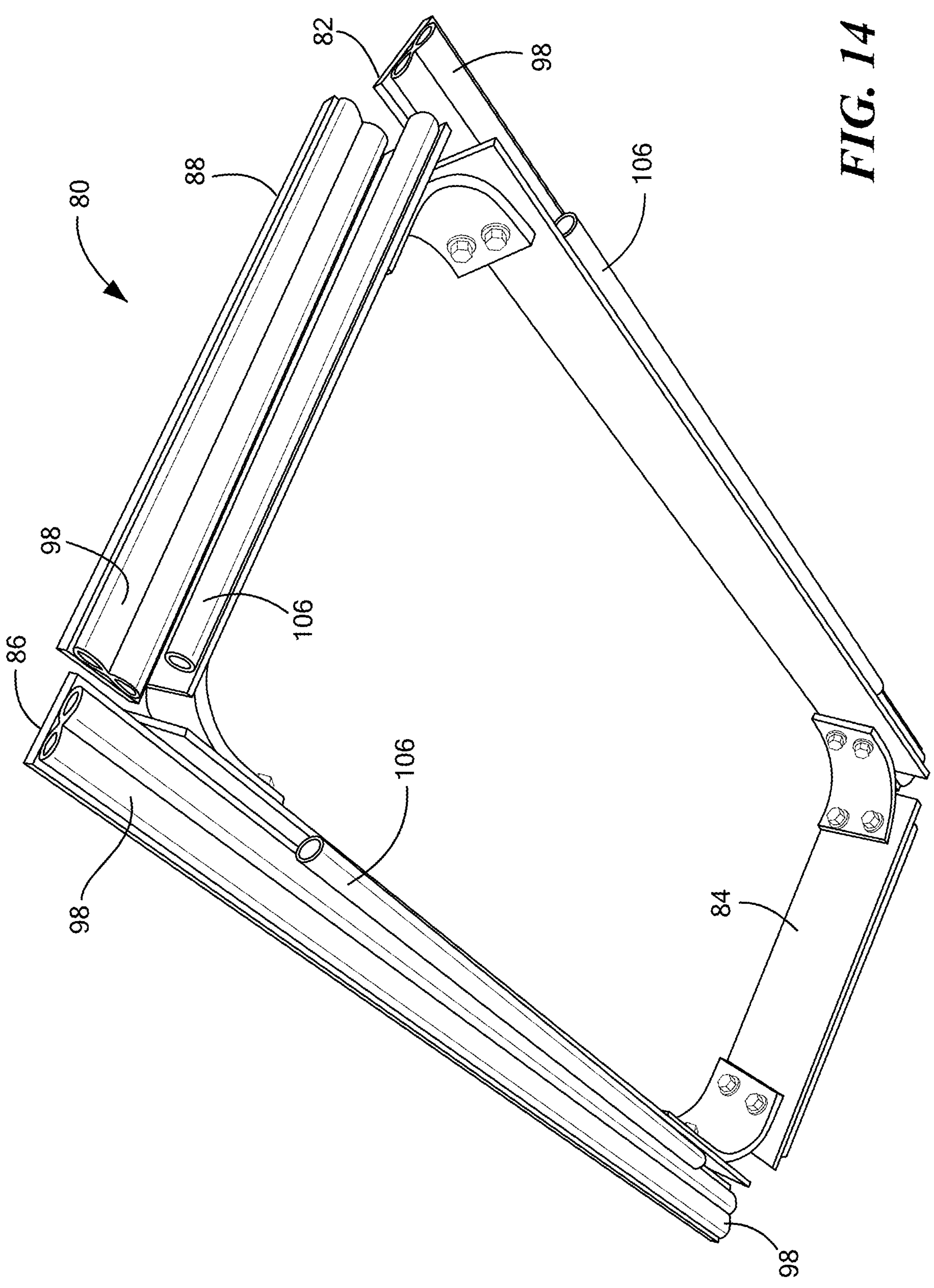
FIG. 14 is a three-dimensional back of the hinged perimeter frame shown in FIG. 12 showing an example of soft flexible seals attached to the back of the frame members.
Figure 15:
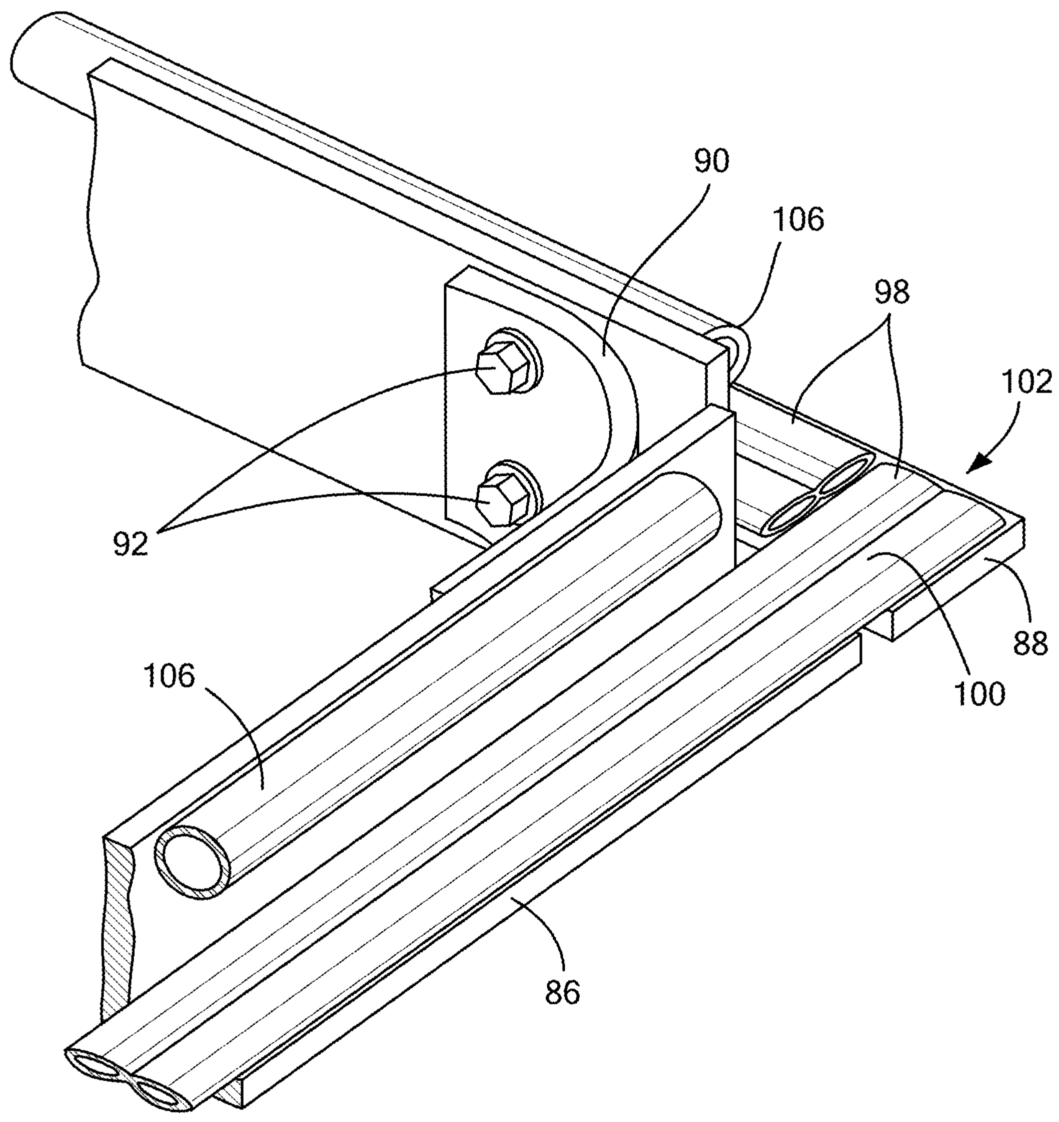
FIG. 15 is a three-dimensional back view showing in further detail an example of an area of the soft flexible seal overlapping an adjacent frame member.

Each of frame members 82, 84, 86, and 88, FIG. 12, preferably include soft flexible seal 98, FIG. 14 affixed to the backside thereof as shown e.g., using a plurality of fasteners as discussed above or adhesive preferably completely free of chemicals that may release undesirable gases, or similar type material. Preferably an area of soft flexible seal 98 on each end of frame members 82 and 86 overlaps an area of adjacent frame members 84 and 88, respectively. For example, e.g., area 100, FIG. 15, of seal 98 located at one end of frame member 86 overlaps area 102 of adjacent frame member 88 as shown. The same holds true for each of the remaining hinges of hinged perimeter frame 80. Soft flexible seal 98 preferably contributes to the optimal seal between the flexible collapsible shroud cover 42 and the sampling platform 12', as discussed below.

Figure 16:
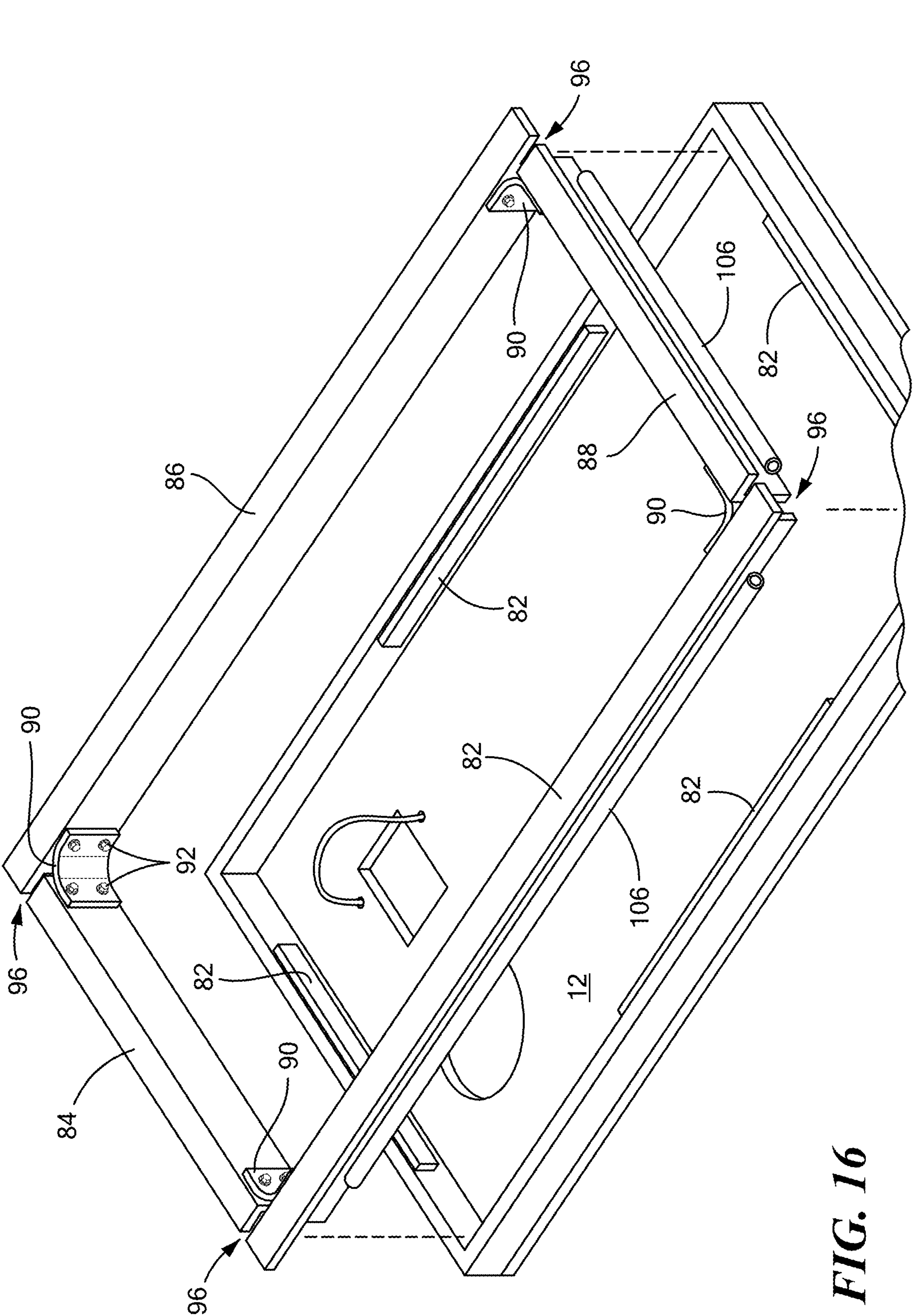
FIGS. 16 and 17 are three-dimensional views showing an example of the hinged perimeter frame shown in one or more of FIGS. 12-15 being secured in place in the sampling platform.
Figure 17:
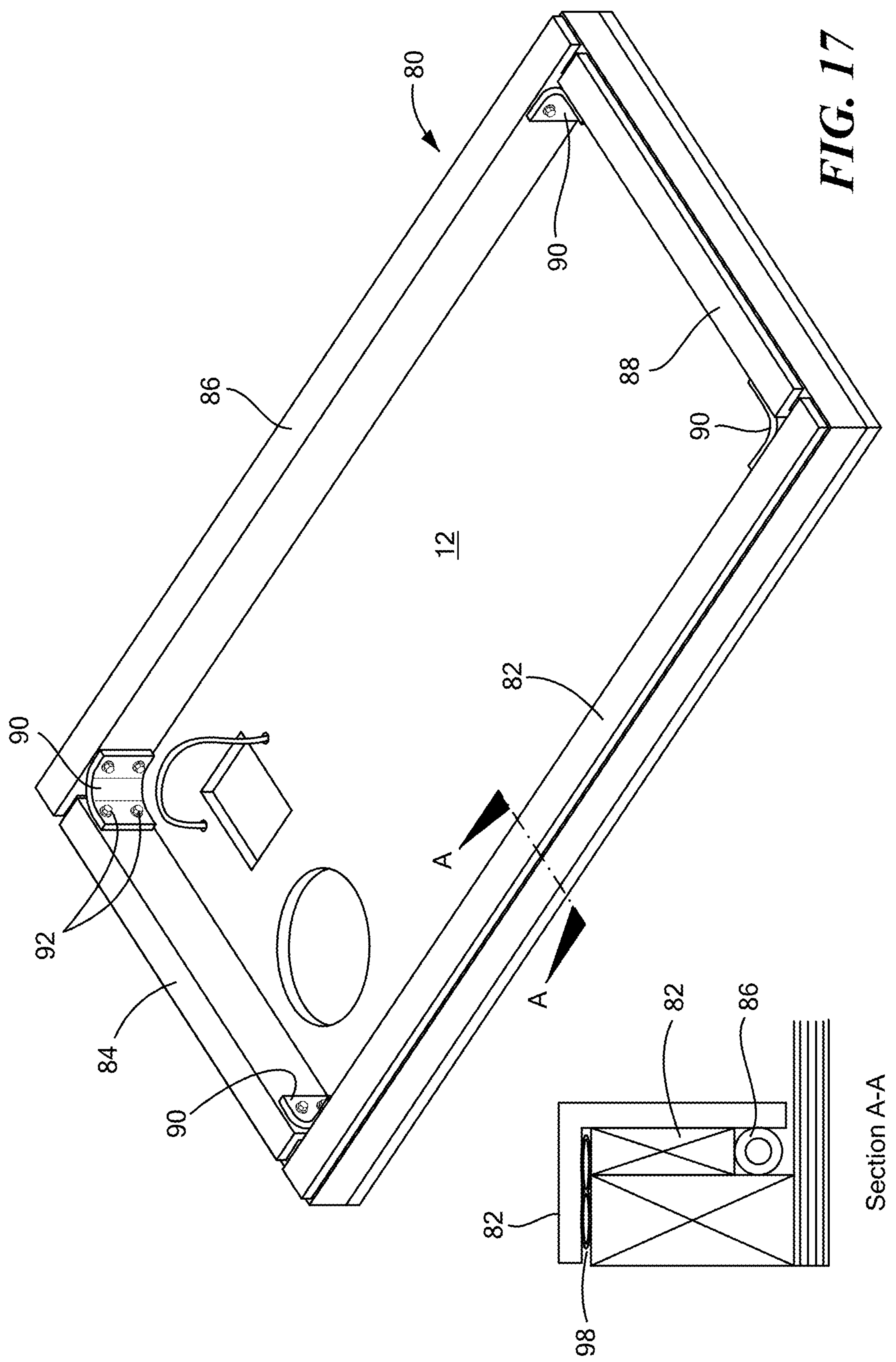

One or more of frame members 82, 84, 86, and 88, FIGS. 12 and 14, preferably include securing member 106, FIG. 14. In this example, each of frame members 82, 84, 86, and 88 include securing member 106 as shown. In other examples, two or three frame members may include securing member 106. FIG. 16 shows in further detail one example of the structure of securing member 106. Securing member 106 on one or more of frame members 82, 84, 86, and 88 is preferably designed to snuggly fit in place below abutment members 82, FIG. 16, of sampling platform 12' to secure hinged perimeter frame 80 to sampling platform 12', e.g., as shown in FIG. 17 and in further detail in section A-A.

Figure 18:
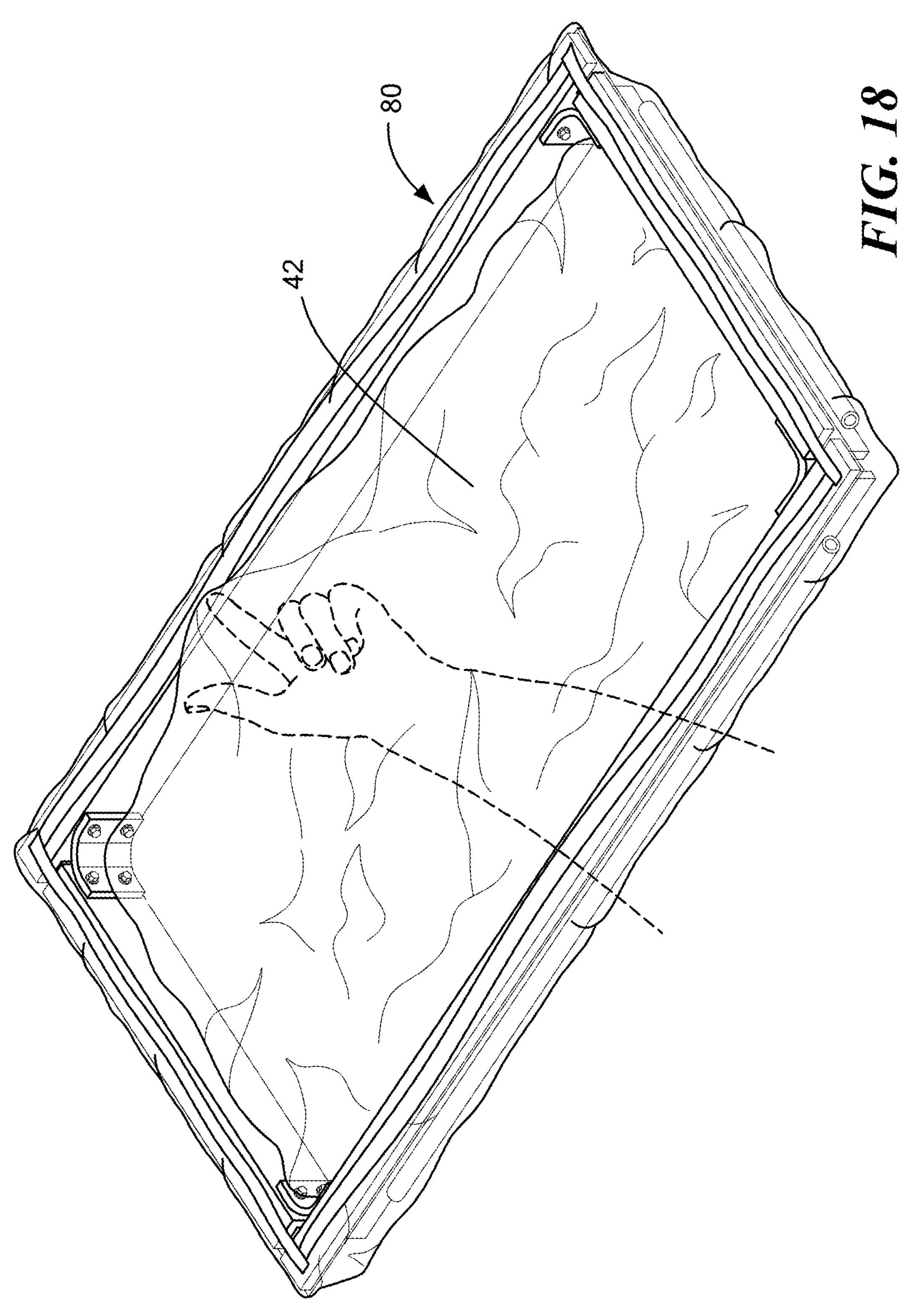
FIG. 18 is a three-dimensional view showing an example of the flexible collapsible shroud cover attached to the hinged perimeter frame before being secured to the sampling platform.

In one exemplary operation, flexible collapsible shroud cover 42 may be secured to hinged perimeter frame 80 using tape or similar material, e.g., as shown in FIG. 18. In this example, hinged perimeter frame 80 with flexible collapsible shroud cover 42 attached thereto is placed over sampling platform 12' with the various components of system 10 discussed above thereon, then secured in-place using securing members 106 and abutment members 82, e.g., as shown om FIG. 19 to create the optimal seal between flexible collapsible shroud cover 42 and sampling platform 12'.

Figure 19:
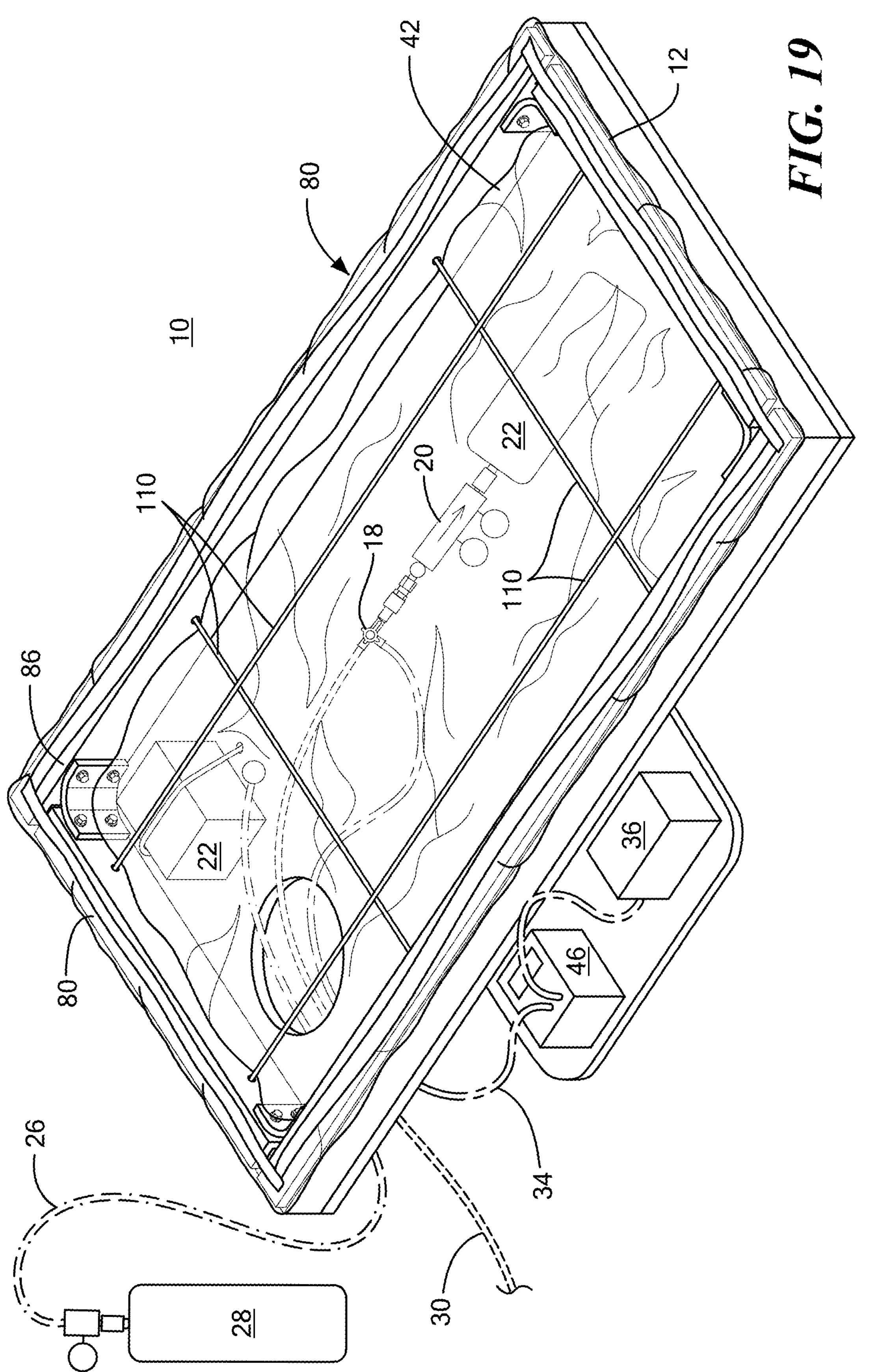
FIG. 19 is a top view showing the hinged perimeter frame secured in place and over the flexible collapsible shroud cover to create an optimal seal between the flexible collapsible shroud cover and the sampling platform.
Figure 20:
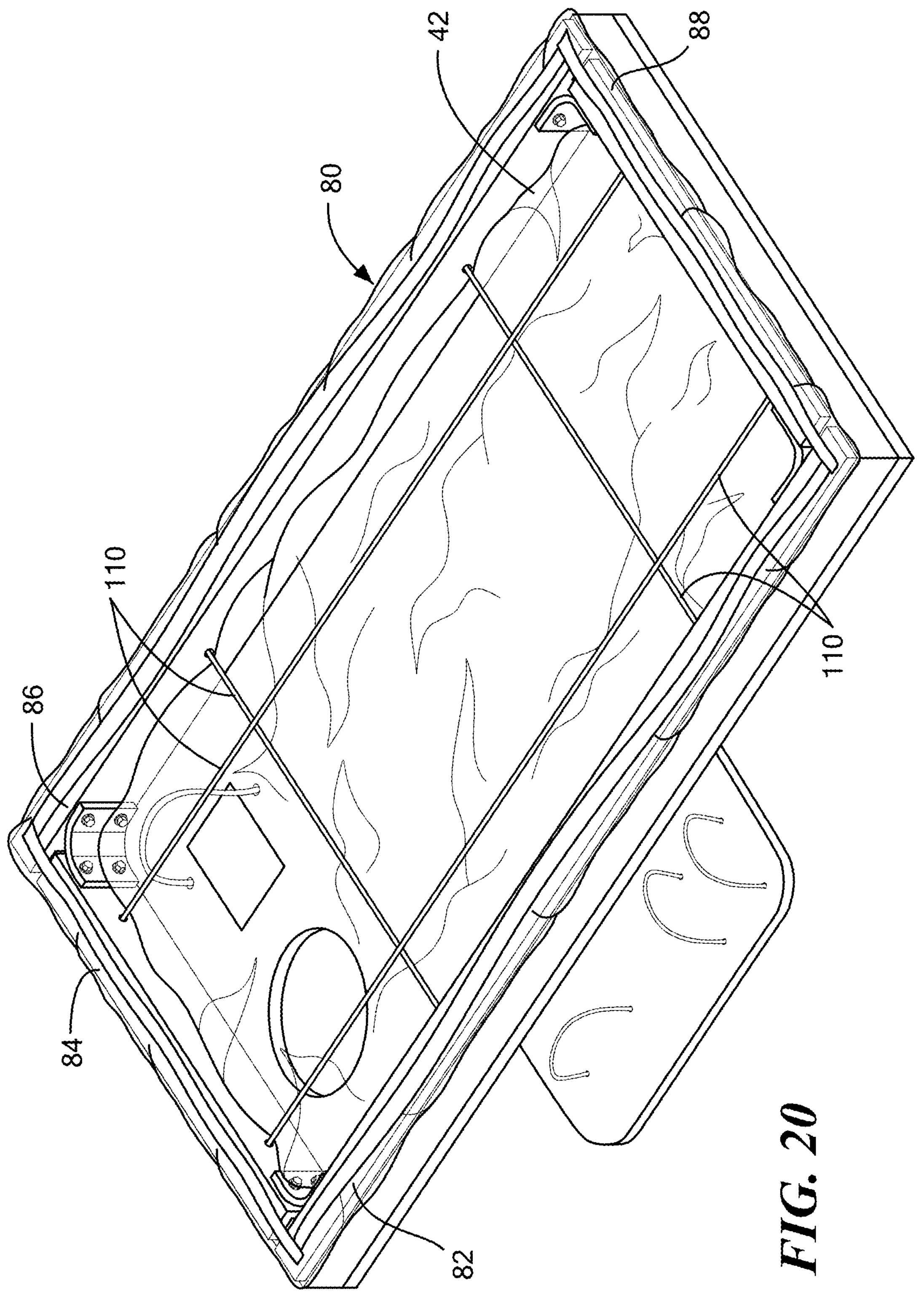
FIG. 20 is a three-dimensional view showing an example of elastic members affixed to the frame members shown in one or more of FIGS. 13-19 used to create an adjustable volume of helium between the flexible collapsible shroud cover and the sampling platform.
Figure 21:
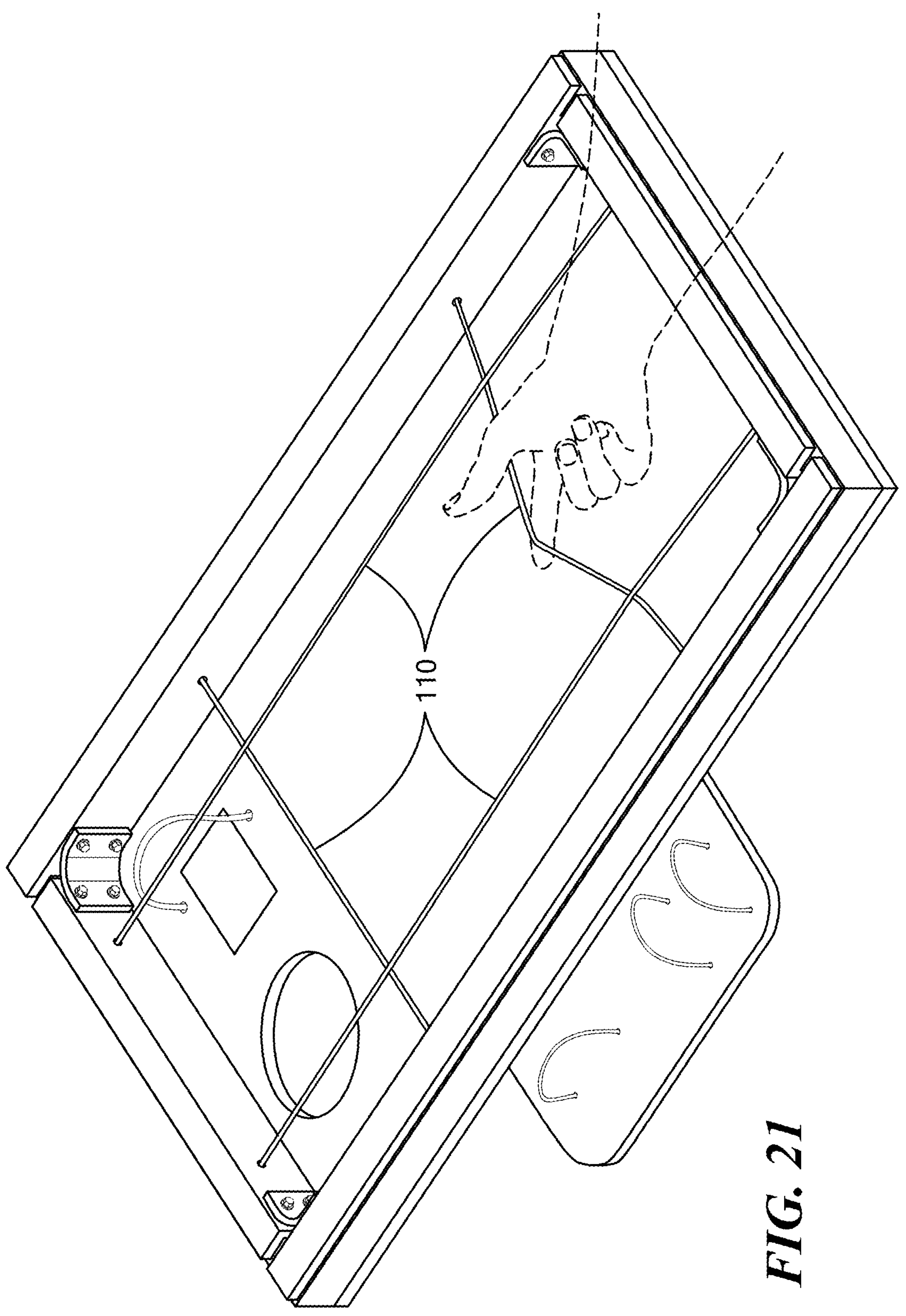
FIG. 21 is a three-dimensional view an example of the one of the elastic members shown in FIG. 20 in an elongated position.

In one design, hinged perimeter frame 80 may include a plurality of elastic members 110, FIGS. 19 and 20, affixed to frame members 82, 84, 86, and 88 as shown. FIG. 21 shows an example of an elastic member 110 in an elongated position. Elastic members 110 preferably make the volume of helium between flexible collapsible shroud cover 42 and sampling platform 12' self-adjustable to a desired volume of helium.

The result is hinged perimeter frame 80 is preferably easy to insert in place and remove from sampling platform 12', hinge members 90 are preferably adjustable to provide outward spring tension of hinged perimeter frame on sampling platform 12', and provides for slight changes in the dimensions of sampling platform 12', soft flexible seal 98 improves the optimal seal, and elastic members 110 preferably hold flexible collapsible shroud cover 42 as low as possible to minimize the amount of helium used and provide for a self-adjustable volume of helium.

Because flexible collapsible shroud cover 42 discussed above is flexible and collapsible, it preferably minimizes the volume of helium needed to determine leak integrity of system 10. To be able to source a leak, a connection is made to the disposable three-way valve 18, FIGS. 1, 3-6, 11 and 19, and purge line 34 set in purge position, a connection between disposable three-way valve 18 and vapor sampling line 30, a connection between disposable three-way valve 18 and flow controller 20, and a connection between flow controller 20 and sampling can 22. A sampling can 22 pressure is measured using one of the pressure gauges on flow controller 20 which preferably checks all junctures between sampling can 22 and disposable three-way valve 18 while purging (shut in test). In-line purge detector 40 determines that all other connections are sound, with an additional check of well integrity once more than one well volume has been purged. Once the purge is complete, sampling can 22 begins by switching disposable three-way valve 18 to sample pathway. Typical sampling time is about 7-10 mins. The entire purge and sampling process typically lasts about 30 minutes. Because flexible collapsible shroud cover 42 remains intact as a thin film above the above-mentioned process, helium is never released after initial injection and tightening of flexible collapsible shroud cover 42 to platform 12. Thus, flexible collapsible shroud cover 42 preferably minimizes the volume of helium needed to determine leak integrity by reducing a space populated by volume 44 of helium throughout this entire process.

Flexible collapsible shroud cover 42 also preferably provides the ability to move disposable three-way valve 18 between valve vapor sampling line 30 and purge line 34 position discussed above.

Disposable three-way valve 18 preferably prevents cross contamination of compounds in the soil vapor sampled by system 10. This is one of the features that makes system 10 reusable.

Helium tracer source 28 introduces a helium tracer to establish volume 44 of helium between flexible collapsible shroud cover 42 and reusable, portable, platform 12.

Ambient helium detector 24 preferably ensures a predetermined concentration of volume 44 of helium, e.g., a concentration of about 20% to 40% helium.

In one example, in-line helium detector 40 preferably detects a threshold percentage of the helium tracer flowing in purge line 34, e.g., at or comparable to the amount read beneath flexible collapsible shroud cover 42. In this example, if helium is detected quickly and at these levels, it indicates there is leakage from the volume of helium into one of the connections discussed above, i.e., the leakage is from above the well.

In another example, in-line helium detector 40 preferably detects a predetermined threshold percentage of the helium tracer flowing in purge line 34 after well 32 has been purged by at least one well volume. In this example, if helium is detected, it indicates a breach in well integrity.

System 10 may include a plurality of disposable three-way valves 18, a plurality of flow controllers 20, a plurality of sampling cans 22, a plurality of vapor sampling lines 30, and/or a plurality of purge lines 34, e.g., three disposable three-way valves 18, flow controllers 20, sampling cans 22, vapor sampling lines 30, and/or purge lines 34, as shown in FIGS. 4-6 and 11. In other examples, system 10 may include one three disposable three-way valve 18, flow controller 20, sampling can 22, vapor sampling line 30, and/or purge line 34 as shown in FIGS. 1 and 19. In yet other examples, system 10 may include two or more than three disposable three-way valves 18, flow controllers 20, sampling cans 22, vapor sampling lines, and/or purge lines 34.

Figure 22:
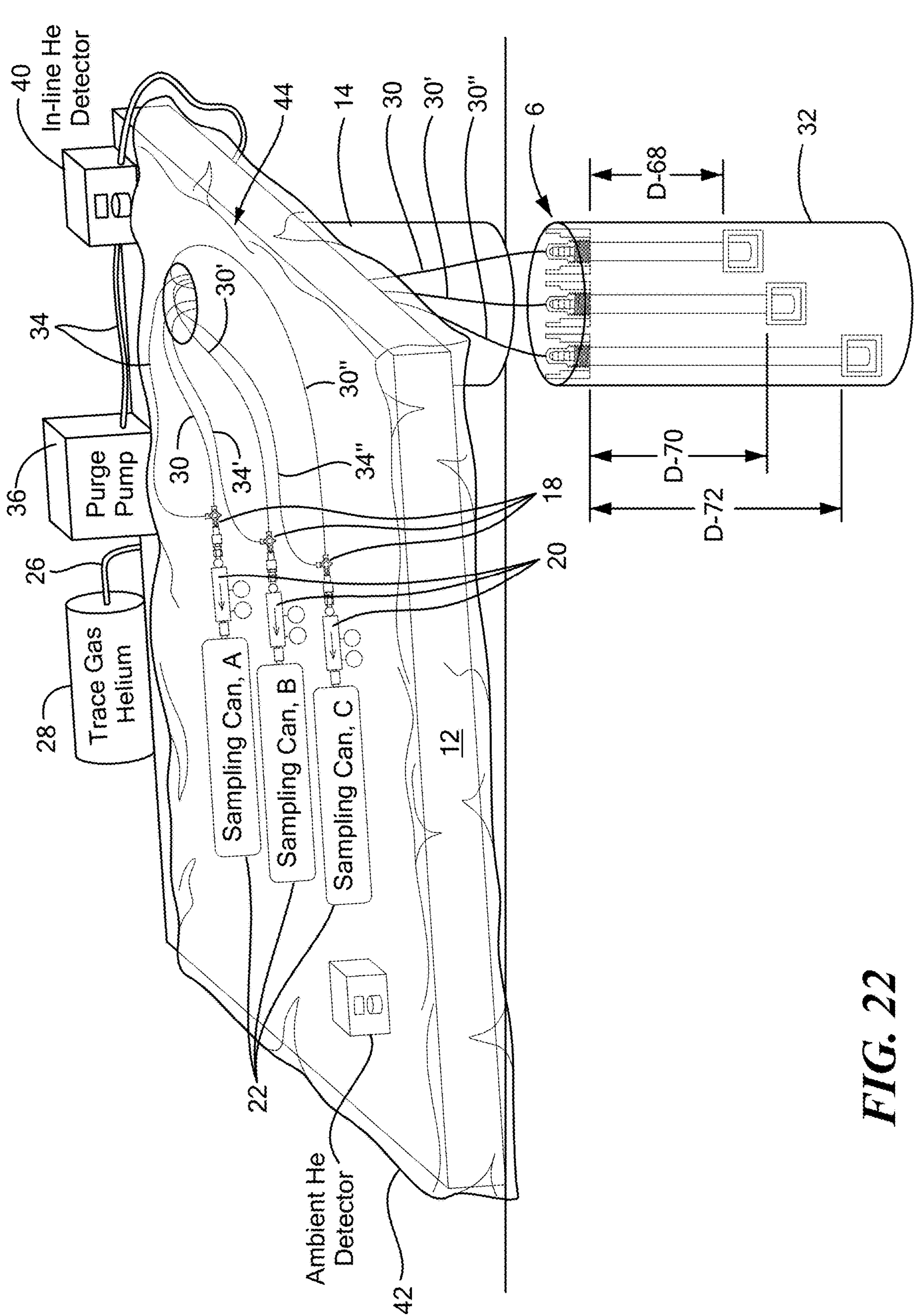
FIG. 22 is a three-dimensional view of the system shown in one or more of FIGS. 1-21 in operation.

FIG. 22 shows an example where each of the plurality vapor sampling lines 30 is preferably coupled to soil vapor sampling well 32 at a different predetermined depth, e.g., depth d-68 for vapor sampling line 30, depth d-70, for vapor sampling line 30', and/or depth-72 for vapor sampling line 30".

Figure 23:
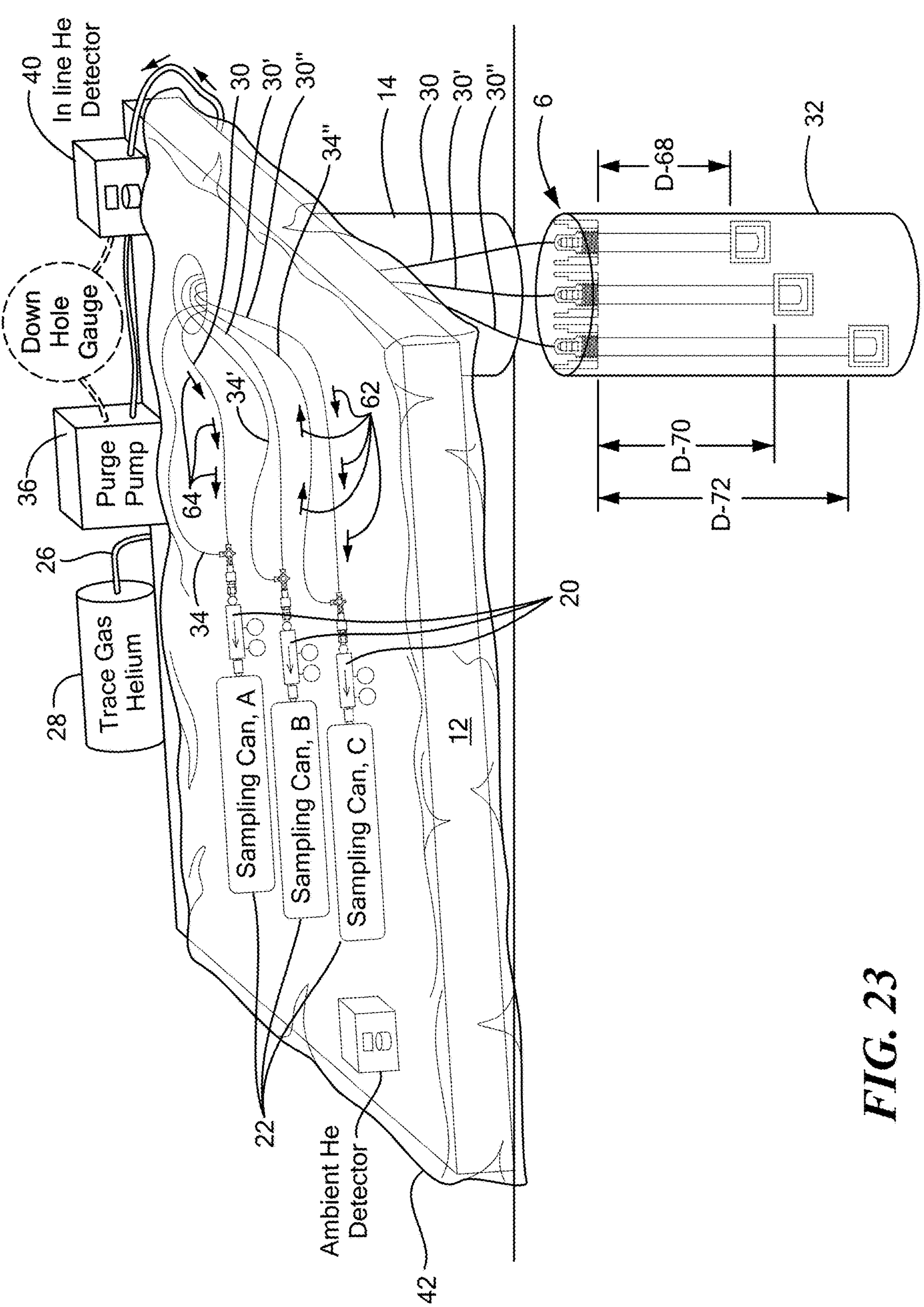
FIG. 23 is a three-dimensional view of the system shown in one or more of FIGS. 1-21 in operation.
Figure 24:
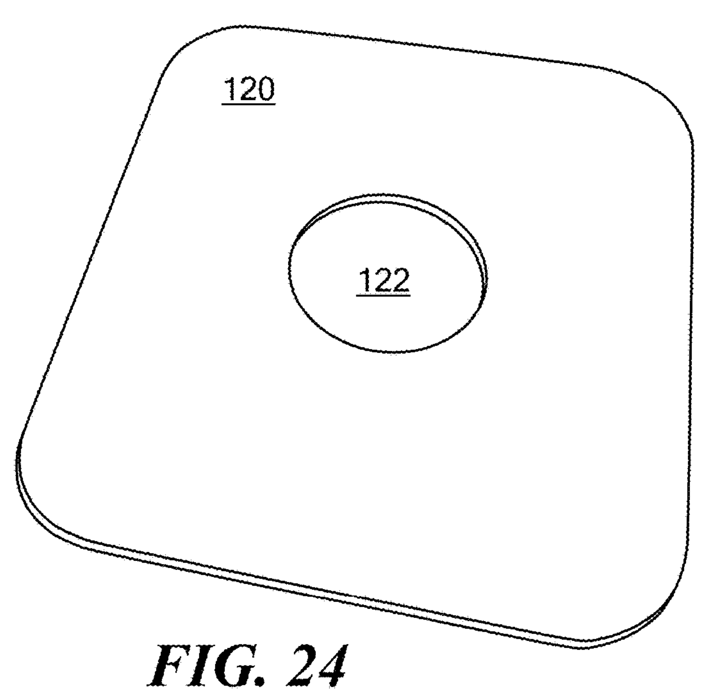
FIG. 24 is a three-dimensional view showing an example of an adapter plate which may be attached to the chimney shown in FIG. 1-3 which may be used to accommodate larger well head.

In exemplarily operation, one of disposable three-way valves 18 preferably purges one of the vapor sampling lines 30, 30', or 30" and another of the plurality of disposable three-way valves 18 simultaneously enables taking a soil vapor sample with another vapor sampling line 30, 30', or 30". FIG. 23 shows an example where disposable three-way valve 18 coupled to vapor sampling lines 30" and purge line 34" is set to purge vapor sampling line 30", indicated by arrows 62, and disposable three-way valve 18 coupled to vapor sampling line 30 and purge line 34 is collecting a soil vapor sample into sampling can 22 A, indicated by arrows 64.

In this example, system 10 can simultaneously purge while taking a soil vapor sample using three disposable three-way valve(s) 18, three vapor sampling lines 30, 30', 30", three purge lines 30, 30', 30" and three sampling cans 22A, B, and C. This feature allows system 10 to purge and take three vapor samples in about 30 minutes, which is significantly faster than the about 1.5 hours required by conventional helium shroud vapor sampling system which require a setup up and take-down for each vapor sample at each well depth. System 10 can also can simultaneously purge while taking a soil vapor sample using two disposable three-way valves 18, two vapor sampling lines 30, two purge lines 30,' and two sampling cans 22 or more than three vapor sampling lines 30, 30', 30", three purge lines 30, 30', 30" and three sampling cans 22A, B, and C.

Figure 2:
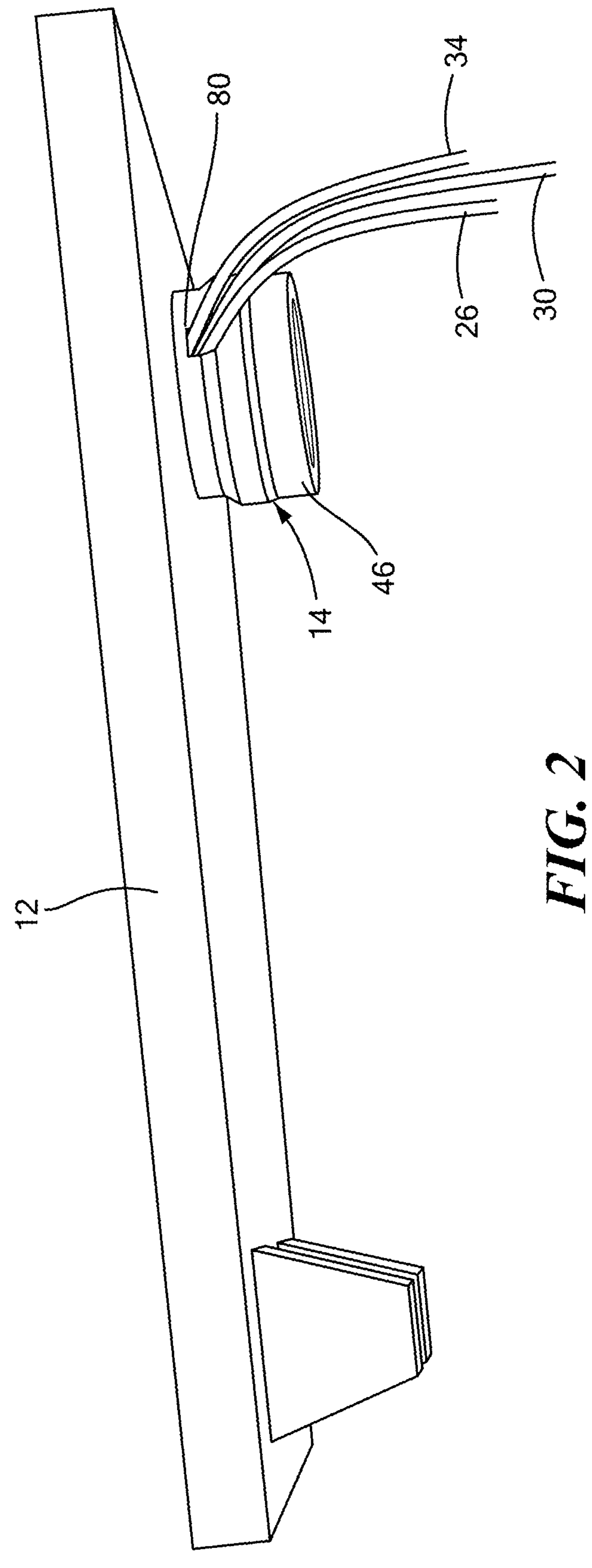
FIG. 2 is a side-view showing in further detail one example of the structure of chimney shown in FIG. 1.
Figure 3:
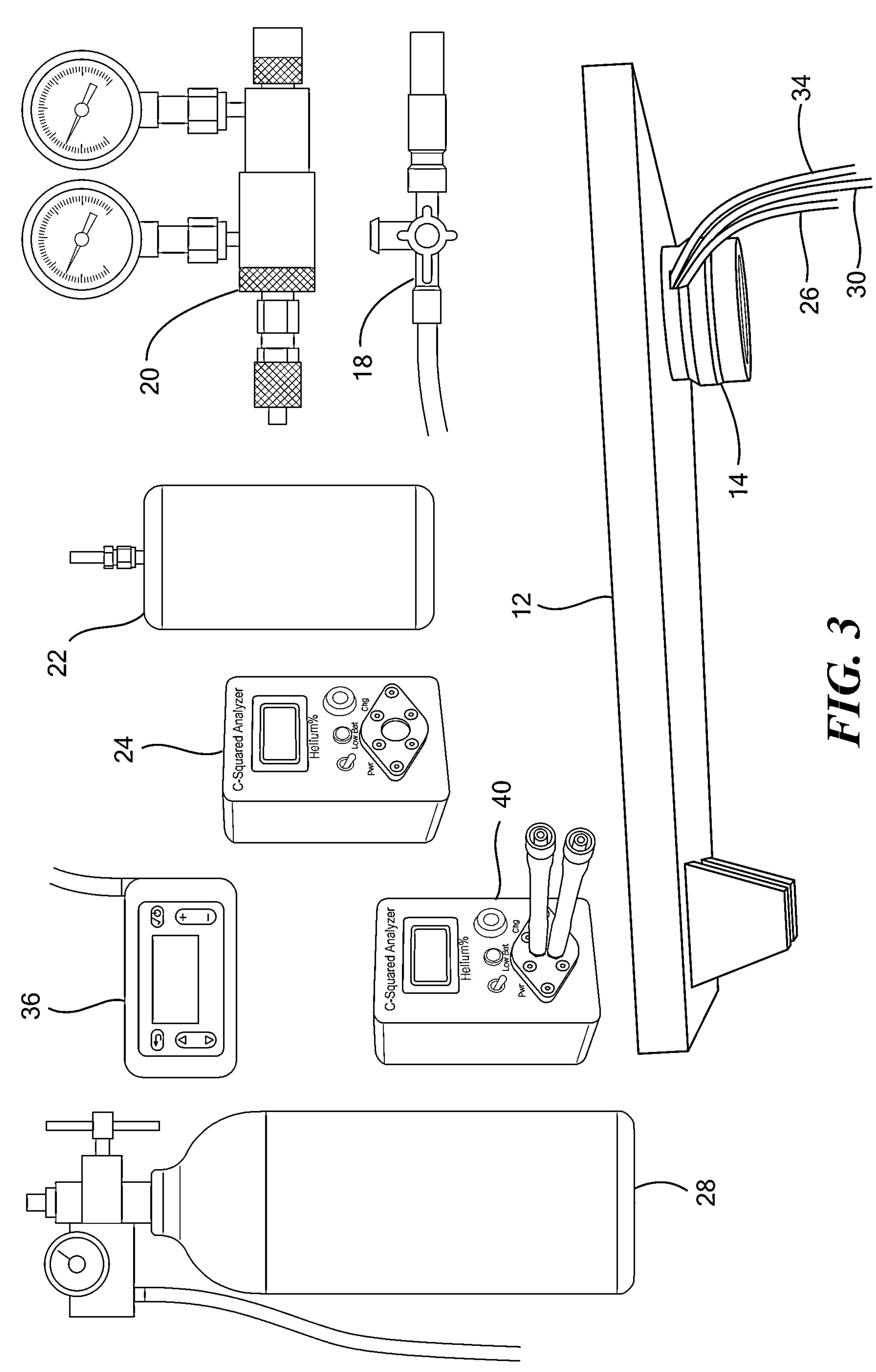
FIG. 3 shows in further detail the various components of the system shown in FIGS. 1 and 2.

Chimney 14, FIGS. 1 and 2, preferably includes housing 46 attachable to well head 16 which creates a seal over well head 16. Chimney 14 also may also include window 80, FIG. 2, cut-out in chimney 14 as shown, which is preferably configured to receive at least one vapor sampling line 30, at least one purge line 34, and helium line 26 coupled to a source of helium. Window 80 is preferably sized to minimize loss of helium from volume 44 of helium and minimize wind infiltration into volume 44 of helium.

Figure 25:
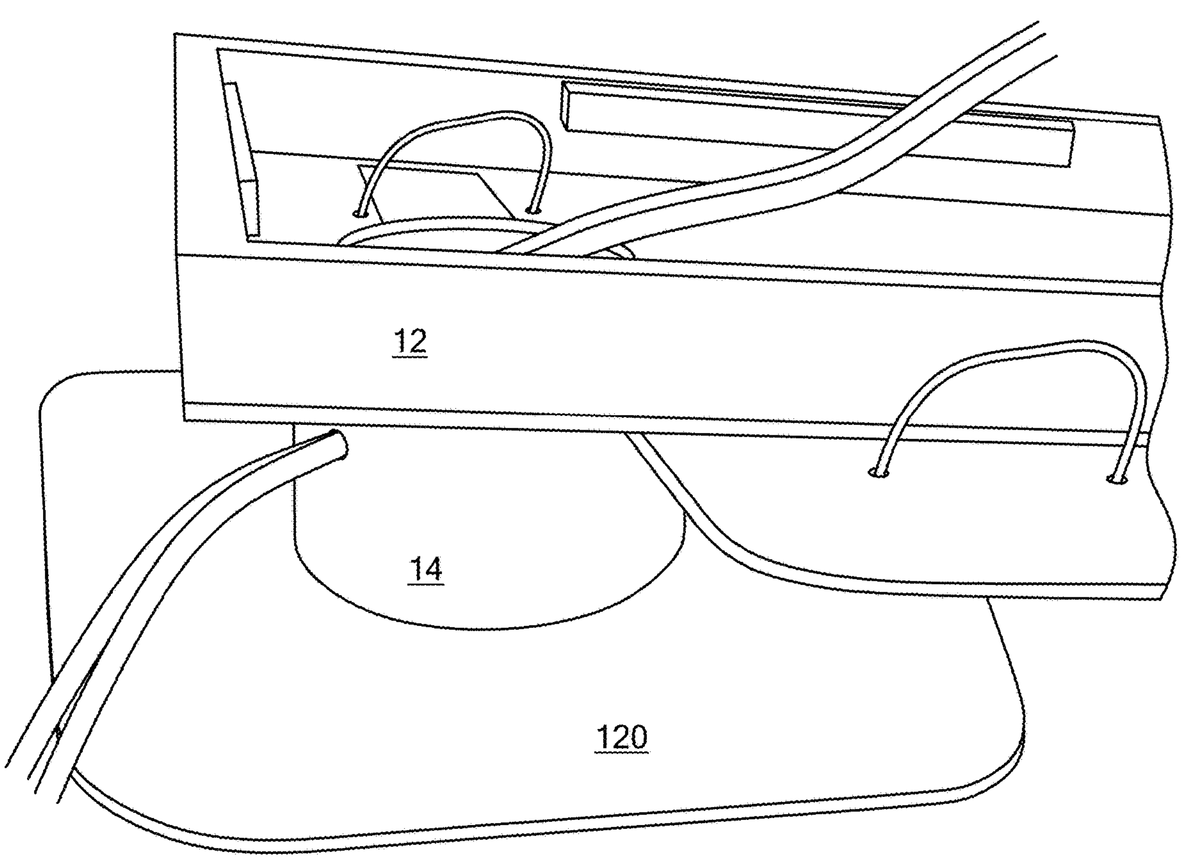
FIG. 25 is a three-dimensional view showing an example of the adapter plate shown in FIG. 24 attached to the chimney.

In operation, the size of well head 16, e.g. as shown in FIG. 1, may be larger than the size of chimney 14. To accommodate this situation, system 10 may include adapter plate 120, FIG. 14 having opening 122 therein. In operation, chimney 14 is placed in opening 122 as shown in FIG. 25 and adapter plate 120 is placed over the larger well head.

Figure 26:
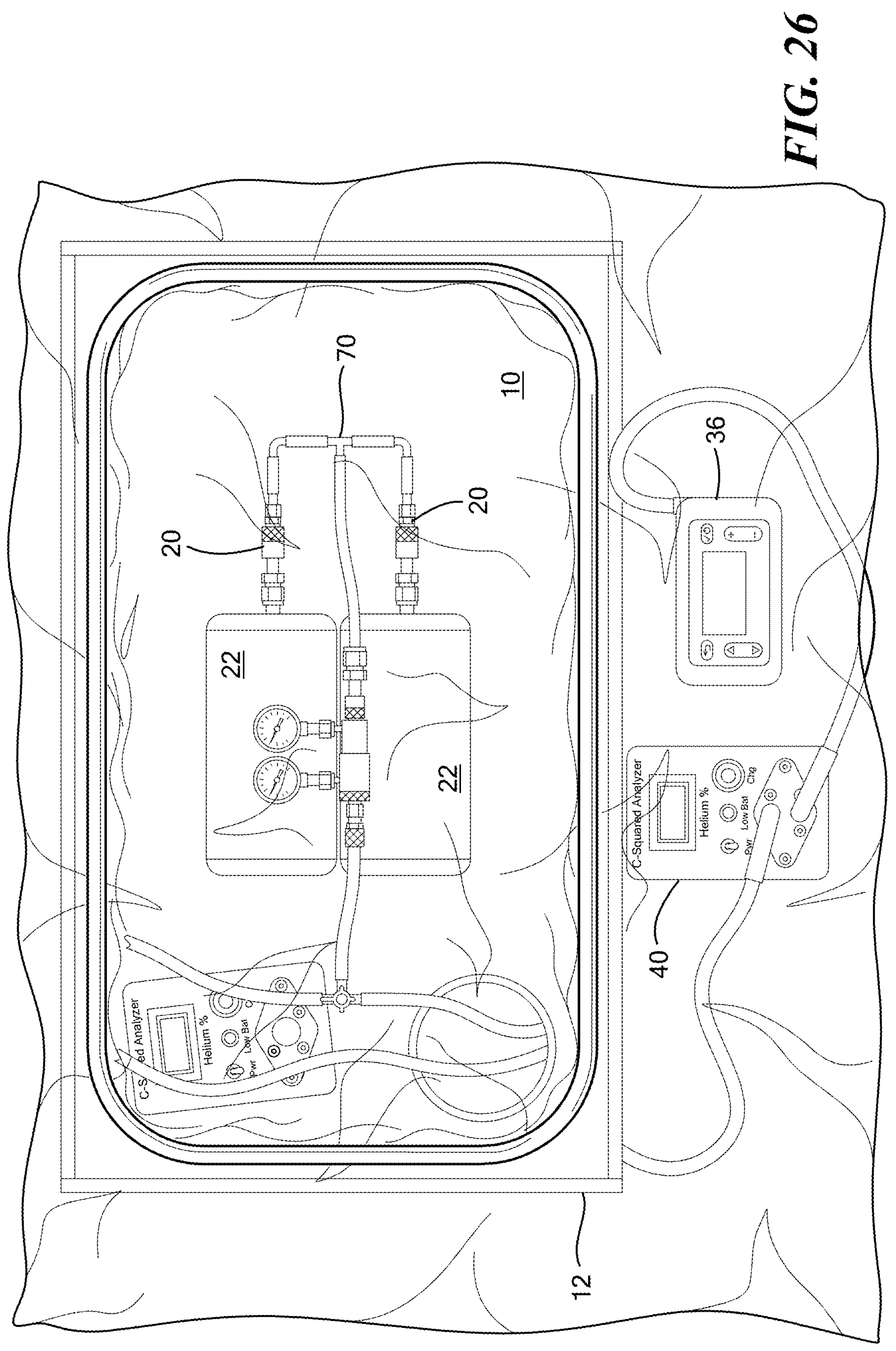
FIG. 26 is a three-dimensional top view showing an example of a flexible collapsible duplicate sampling splitter coupled to two sampling cans to minimize the size of the system.

In one design, system 10 preferably includes the flexible collapsible duplicate sampling splitter 70, FIG. 26, where like parts have like numbers, coupled to two sampling cans 22, 22' as shown. Sampling splitter 70 preferably minimizes the overall size of system 10.

The result is the at least one disposable three-way valve 18 makes system 10 reusable because disposable three-way valve 18 prevents cross-contamination of compounds and is preferably disposed of after each use. Disposable three-way valve 18 and flow controller 20 are not attached or affixed to flexible collapsible shroud cover 42, which makes system 10 reusable and portable and eliminates the need to have a manifold that is re-certified after each use. Flexible collapsible shroud cover 42 reduces and optimizes the amount of helium needed, which significantly reduces the cost of a soil vapor sample. Hinged perimeter frame 80 is preferably flexible, durable, and can flex and twist such that it can easily be inserted into sampling platform 12'. The unique design of chimney 14 with window 80 provides wind protection and provides portability on site. Adapter plate 120 allows chimney 14 to be used on larger sized well heads. Reusable sampling platform 12 may be used as a workstation and is mobile between wells. System 10 also supports multiple disposable three-way valve(s) 18, flow controllers 18, and sampling cans 22 which provides for sampling at multiple well depths at the same time. There is no need to break-down system 10 and reassemble it between wells or even at different depths, as found in a conventional helium shroud vapor sampling system. System 10 is portable, reusable, mobile, and saves significant time when compared to conventional systems. Another key feature of system 10 is that in-line helium detector 40 provides for in-field leak integrity checking at three-way valve(s) 18, flow controller (s) 20, sampling can(s) 20, vapor sampling line(s) 30 and purge line(s) 34 prior to and while the soil vapor samples are being taken. Thus, the ability to monitor helium breakthrough while purging provides a real-time in-field leak integrity check. System 10 is also compact, creates a portable workstation on-site, and the unique splitter flexibility provides the taking duplicate vapor samples without using more helium. The ability to have the setup of system 10 be mobile and on-site is not only faster by reducing the set up at each location, system 10 is also more ergonomic and provides greater time for attention of field staff to focus on the quality of the work being done. The fact that system 10 is turn-key, complete, reusable, and slightly lifted from the ground makes for a predictable work surface, something not offered by conventional soil vapor systems. This removes unforeseen site condition issues and creates a direct interface to the well.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A reusable modified helium shroud soil vapor sampling system with an in-line helium detector, the system comprising:

a reusable, portable, sampling platform including a chimney attachable to a well head;

the sampling platform including an area for placement of at least one disposable three-way valve, at least one flow controller, at least one sampling can, an ambient helium detector, a line coupled to a helium tracer source, at least one vapor sampling line coupled to a soil vapor sampling well at a predetermined depth, and at least one purge line coupled to at least one purge source;

an in-line helium detector coupled between the at least one purge line and the at least one purge source; and a flexible collapsible shroud cover configured to optimally seal a volume of helium between the shroud cover and the sampling platform.

2. The system of claim 1 wherein the collapsible shroud cover is configured to minimize the volume of helium needed to determine leak integrity of at least one of: the at least one disposable three-way valve, a connection between the disposable three-way valve and the at least one purge line, a connection between the disposable three-way valve and the vapor sampling line, a connection between the disposable three-way valve and the flow controller, and/or a connection between the flow controller and the sampling can.

3. The system of claim 2 in which the at least one disposable three-way valve is configured to provide for reuse of the system.

4. The system of claim 1 in which the at least one disposable three-way valve is configured to prevent cross-contamination of compounds in the soil vapor.

5. The system of claim 1 in which the line coupled to the helium source introduces helium tracer to establish the volume of helium between the flexible collapsible shroud cover and the reusable platform.

6. The system of claim 1 in which the ambient helium detector is configured to ensure a predetermined concentration of the volume of helium.

7. The system of claim 1 in which the flexible collapsible shroud cover is configured to minimize the volume of helium needed to determine the leak integrity by reducing the space populated with helium while the system is operational.

8. The system of claim 1 in which the in-line helium detector is configured to detect a predetermined threshold percentage of the helium tracer flowing in the at least one purge line, thereby indicating a breach of the leak integrity above a surface of a well.

9. The system of claim 1 in which the in-line helium detector is configured to detect a predetermined threshold percentage of the helium tracer flowing in the at least one purge line after the well has been purged with at least one well volume, thereby indicating a breach between a surface of the well and a sub-surface of the well.

10. The system of claim 1 in which the at least one vapor sampling line coupled to the soil vapor sampling well at a predetermined depth includes a plurality of vapor sampling lines each coupled to the soil vapor sampling well at a different predetermined depth.

11. The system of claim 1 in which one disposable three-way valve is positioned to purge the vapor sampling line and another of the three-way valve is positioned to simultaneously enable collecting a soil vapor sample.

12. The system of claim 1 including at least one of a perimeter frame, weighted perimeter frame, or weighted chain placed about a perimeter of the sampling platform and over the flexible collapsible shroud cover to create an optimal seal between the flexible collapsible shroud cover and the sampling platform.

13. The system of claim 1 in which the sampling platform includes a lip about a perimeter of the platform.

14. The system of claim 13 including at least one of a perimeter frame, weighted perimeter frame, or weighted chain insertable into the lip and over the flexible collapsible shroud cover to create an optimal seal between the flexible collapsible shroud cover and the sampling platform.

15. The system of claim 1 including a plurality of clamps placed about a perimeter of the platform and over the flexible collapsible shroud cover to create an optimal seal between the flexible collapsible shroud cover and the sampling platform.

16. The system of claim 1 including a flexible perimeter frame.

17. The system of claim 16 in which the sampling platform includes a plurality of abutment members disposed on one or more sides of the sampling platform configured to secure the flexible perimeter frame over the flexible collapsible shroud cover to the create an optimal seal between the flexible collapsible shroud cover and the sampling platform.

18. The system of claim 1 including a hinged perimeter frame.

19. The system of claim 18 in which the sampling platform includes a plurality of abutment members disposed on one or more sides of the sampling platform configured to secure the hinged perimeter frame over the flexible collapsible shroud cover to the create an optimal seal between the flexible collapsible shroud cover and the sampling platform.

20. The system of claim 19 in which the hinged perimeter frame includes a plurality of frame members hingedly attached to each other by a plurality of hinge members.

21. The system of claim 20 in which the plurality hinge members are positioned to create a small gap between each of the frame members such that the hinged perimeter frame is flexible and adjustable.

22. The system of claim 20 in which each frame member includes a soft flexible seal configured to improve an optimal seal between the flexible collapsible shroud cover and the sampling platform.

23. The system of claim 20 in which a plurality of frame members each include a securing member configured to be disposed in a space below one or the plurality of abutment members to secure the hinged perimeter frame to the sampling platform.

24. The system of claim 20 including at least one elastic member affixed to the plurality of frame members configured to provide an adjustable volume of helium between the flexible collapsible shroud cover and the sampling platform.

25. The system of claim 1 in which the chimney includes a housing attachable to the well head configured to create a seal over the well head.

26. The system of claim 25 in which the housing includes a window for receiving the at least one purge line and the helium line.

27. The system of claim 26 in which the window is sized to minimize loss of helium from the volume of helium and minimize ambient air infiltration into the volume of helium.

28. The system of claim 1 including an adapter plate including an opening therein configured to receive the chimney and provide for attachment of the chimney to a large well head.

29. The system of claim 1 including a flexible collapsible duplicate sampling splitter coupled to two sampling cans configured to minimize a size of the system.

* * * * *